(12) United States Patent
Amick

(10) Patent No.: US 7,059,233 B2
(45) Date of Patent: Jun. 13, 2006

(54) TUNGSTEN-CONTAINING ARTICLES AND METHODS FOR FORMING THE SAME

(76) Inventor: Darryl D. Amick, 3227 Countryman Cir.,NW., Albany, OR (US) 97321

( * ) Notice: Subject to any disclaimer, the term of this patent is extended or adjusted under 35 U.S.C. 154(b) by 175 days.

(21) Appl. No.: 10/698,827

(22) Filed: Oct. 31, 2003

(65) Prior Publication Data
US 2004/0216589 A1 Nov. 4, 2004

Related U.S. Application Data

(63) Continuation-in-part of application No. 10/688,071, filed on Oct. 17, 2003, now Pat. No. 6,823,798, which is a continuation of application No. PCT/US03/02579, filed on Jan. 29, 2003.

(60) Provisional application No. 60/462,164, filed on Apr. 11, 2003, provisional application No. 60/423,232, filed on Nov. 1, 2002, provisional application No. 60/422,937, filed on Nov. 1, 2002, provisional application No. 60/422,935, filed on Nov. 1, 2002, provisional application No. 60/423,331, filed on Oct. 31, 2002.

(51) Int. Cl.
*F42B 33/00* (2006.01)

(52) U.S. Cl. ............... 86/54; 102/517; 75/248

(58) Field of Classification Search ............ 102/517, 102/518, 519; 86/54, 57; 75/248
See application file for complete search history.

(56) References Cited

U.S. PATENT DOCUMENTS

| | | | |
|---|---|---|---|
| 1,514,908 A | 11/1924 | Jannell | |
| 1,847,617 A | 3/1932 | Löwenstein et al. | |
| 2,119,876 A | 6/1938 | Corson | |
| 2,183,359 A | 12/1939 | Smithells | |
| 2,775,536 A | 12/1956 | Fine | 148/11.5 |
| 2,919,471 A | 1/1960 | Hechinger | |
| 2,995,090 A | 8/1961 | Daubenspeck | |
| 3,123,003 A | 3/1964 | Lange, Jr. et al. | |

(Continued)

FOREIGN PATENT DOCUMENTS

CA 521944 2/1956

(Continued)

OTHER PUBLICATIONS

"Steel 3-inch Magnum Loads Our Pick For Waterfowl Hunting," *Gun Tests*, Jan. 1998, pp. 25-27.

(Continued)

*Primary Examiner*—Stephen M. Johnson
(74) *Attorney, Agent, or Firm*—Kolisch Hartwell, P.C.

(57) ABSTRACT

Tungsten-containing articles and manufacturing processes for tungsten-containing articles. The articles may include firearms projectiles, such as shot, shot slugs, bullets, big game bullets, lead-equivalent bullets, black powder bullets, etc.; radiation shields; and weights, such as fishing weights, dart weights, golf club weights, wheel weights, stabilizers, etc. The projectiles may be at least one of non-toxic, lead-free, ferromagnetic, frangible, sintered, sealed, plated, and/or jacketed. The manufacturing processes include various powder-metallurgy and molten metal processes, and sealing, reforming, intermediate structure, reshaping, plating, working, and jacketing steps which may be selectively utilized. The processes may include forming an intermediate structure and reshaping the structure under different pressure or process to a desired shape. Powders of the tungsten-containing composition may have a flowmeter reading for fifty grams through a cone (without tapping) of less than 18 seconds, and the intermediate and/or final article may have an extrusion constant of less than 30,000 psi.

23 Claims, 11 Drawing Sheets

U.S. PATENT DOCUMENTS

| | | | | |
|---|---|---|---|---|
| 3,328,139 A | * | 6/1967 | Hodge et al. | 428/566 |
| 3,372,021 A | | 3/1968 | Forbes et al. | |
| 3,623,849 A | | 11/1971 | Benjamin | |
| 3,669,656 A | | 6/1972 | Murphy et al. | 75/156 |
| 3,785,801 A | | 1/1974 | Benjamin | |
| 3,888,636 A | | 6/1975 | Sczerzenie et al. | 75/176 |
| 3,890,145 A | | 6/1975 | Hivert et al. | 29/182 |
| 3,953,194 A | | 4/1976 | Hartline, III et al. | 75/203 |
| 3,979,234 A | | 9/1976 | Northcutt, Jr. et al. | 75/200 |
| 4,027,594 A | | 6/1977 | Olin et al. | |
| 4,035,115 A | | 7/1977 | Hansen | 418/183 |
| 4,035,116 A | | 7/1977 | O'Brien et al. | 264/5 |
| 4,138,249 A | | 2/1979 | Rosof | 75/103 |
| 4,274,940 A | | 6/1981 | Plancqueel et al. | 204/294 |
| 4,338,126 A | | 7/1982 | Vanderpool et al. | |
| 4,383,853 A | | 5/1983 | Zapffe | 75/122.7 |
| 4,428,295 A | | 1/1984 | Urs | 102/448 |
| 4,488,959 A | | 12/1984 | Agar | 209/167 |
| 4,760,794 A | | 8/1988 | Allen | 102/473 |
| 4,762,559 A | | 8/1988 | Penrice et al. | 75/248 |
| 4,780,981 A | | 11/1988 | Hayward et al. | |
| 4,784,690 A | | 11/1988 | Mullendore | 75/248 |
| 4,881,465 A | | 11/1989 | Hooper et al. | 102/501 |
| 4,897,117 A | | 1/1990 | Penrice | 75/248 |
| 4,931,252 A | | 6/1990 | Brunisholz et al. | 419/31 |
| 4,940,404 A | | 7/1990 | Ammon et al. | 75/246 |
| 4,949,644 A | | 8/1990 | Brown | 102/498 |
| 4,949,645 A | | 8/1990 | Hayward et al. | 102/517 |
| 4,960,563 A | | 10/1990 | Nicolas | 419/28 |
| 4,961,383 A | | 10/1990 | Fishman et al. | 102/517 |
| 4,990,195 A | | 2/1991 | Spencer et al. | 72/202 |
| 5,069,869 A | | 12/1991 | Nicolas et al. | 102/518 |
| 5,088,415 A | | 2/1992 | Huffman et al. | 102/515 |
| 5,160,805 A | | 11/1992 | Winter | 102/507 |
| 5,264,022 A | | 11/1993 | Haygarth et al. | 102/448 |
| 5,279,787 A | | 1/1994 | Oltrogge | 419/38 |
| 5,399,187 A | | 3/1995 | Mravic et al. | 75/228 |
| 5,527,376 A | | 6/1996 | Amick et al. | 75/246 |
| 5,713,981 A | | 2/1998 | Amick | 75/340 |
| 5,719,352 A | | 2/1998 | Griffin | 102/517 |
| 5,740,516 A | | 4/1998 | Jiranek, II et al. | 428/553 |
| 5,760,331 A | | 6/1998 | Lowden et al. | 102/439 |
| 5,786,416 A | | 7/1998 | Gardner et al. | 102/517 |
| 5,814,759 A | | 9/1998 | Mravic et al. | 102/517 |
| 5,820,707 A | | 10/1998 | Amick et al. | 501/134 |
| 5,831,188 A | | 11/1998 | Amick et al. | 75/246 |
| 5,847,313 A | | 12/1998 | Beal | 102/516 |
| 5,868,879 A | | 2/1999 | Amick et al. | 420/417 |
| 5,877,437 A | | 3/1999 | Oltrogge | 75/228 |
| 5,894,644 A | | 4/1999 | Mravic | 102/517 |
| 5,905,936 A | | 5/1999 | Fenwick et al. | 264/58 |
| 5,913,256 A | | 6/1999 | Lowden et al. | 75/248 |
| 5,917,143 A | | 6/1999 | Stone | 102/506 |
| 5,922,978 A | | 7/1999 | Carroll | 75/240 |
| 5,950,064 A | | 9/1999 | Robinson et al. | 419/47 |
| 5,963,776 A | | 10/1999 | Lowden et al. | 102/506 |
| 6,048,379 A | | 4/2000 | Bray et al. | 428/546 |
| 6,090,178 A | | 7/2000 | Benini | 102/517 |
| 6,136,105 A | | 10/2000 | Spencer | 148/514 |
| 6,174,494 B1 | | 1/2001 | Lowden et al. | 102/517 |
| 6,182,574 B1 | | 2/2001 | Giannoni | 102/516 |
| 6,248,150 B1 | | 6/2001 | Amick | 75/248 |
| 6,257,149 B1 | | 7/2001 | Cesaroni | 102/515 |
| 6,270,549 B1 | | 8/2001 | Amick | 420/430 |
| 6,279,447 B1 | | 8/2001 | Beal | 102/430 |
| 6,368,376 B1 | * | 4/2002 | Hong et al. | 75/235 |
| 6,371,029 B1 | | 4/2002 | Beal | 102/516 |
| 6,439,124 B1 | | 8/2002 | Enlow et al. | 102/501 |
| 6,447,715 B1 | | 9/2002 | Amick | 420/430 |
| 6,457,417 B1 | | 10/2002 | Beal | 102/517 |
| 6,527,824 B1 | | 3/2003 | Amick | 75/248 |
| 6,527,880 B1 | | 3/2003 | Amick | 148/423 |
| 6,530,328 B1 | | 3/2003 | Burczynski et al. | 102/507 |
| 6,546,875 B1 | | 4/2003 | Vaughn et al. | 102/507 |
| 6,551,375 B1 | | 4/2003 | Siddle et al. | 75/248 |
| 6,551,376 B1 | | 4/2003 | Beal | 75/252 |
| 6,581,523 B1 | | 6/2003 | Beal | 102/516 |
| 6,591,730 B1 | | 7/2003 | Beal | 102/506 |
| 6,805,057 B1 | | 10/2004 | Carr et al. | 102/509 |
| 6,845,719 B1 | | 1/2005 | Spencer | 102/519 |
| 2002/0124759 A1 | | 9/2002 | Amick | 102/439 |
| 2002/0152915 A1 | | 10/2002 | Vaughn et al. | 102/507 |
| 2003/0027005 A1 | | 2/2003 | Elliott | 428/457 |
| 2003/0161751 A1 | | 8/2003 | Elliott | 75/245 |
| 2003/0164063 A1 | | 9/2003 | Elliott | 75/252 |

FOREIGN PATENT DOCUMENTS

| | | |
|---|---|---|
| GB | 731237 | 6/1955 |
| GB | 1514908 | 6/1978 |
| GB | 2149067 A | 6/1985 |
| JP | 52-68800 | 6/1977 |
| JP | 59-6305 | 1/1984 |
| JP | 1-142002 | 6/1989 |
| WO | WO 00/37878 | 6/2000 |

OTHER PUBLICATIONS

Carmichel, Jim, "Heavy Metal Showdown," *Outdoor Life*, Apr. 1997, pp. 73, 74, 76, 78.

"Federal's New Tungsten Pellets," *American Hunter*, Jan. 1997, pp. 19, 48-50.

Li, C.-J., et al., "Enhanced Sintering of Tungsten-Phase Equilibria Effects on Properties," The International Journal of Powder Metallurgy & Powder Technology, vol. 20, No. 2, pp. 149-162 (Apr. 1984).

Sykes, W. P., "The Iron-tungsten System," Meeting of the American Institute of Mining and Metallurgical Engineers, New York, pp. 968-1008 (Feb. 1926).

* cited by examiner

Fig. 10
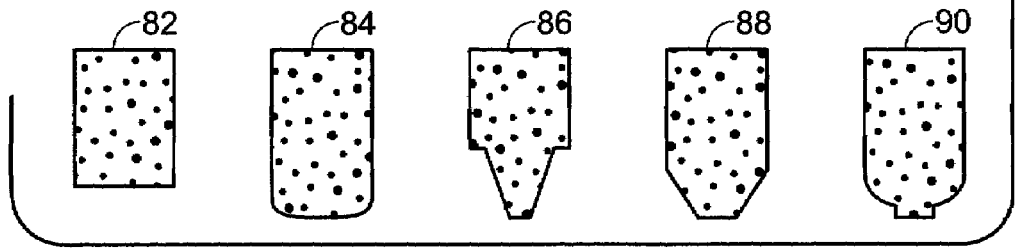
Fig. 11          Fig. 12          Fig. 13
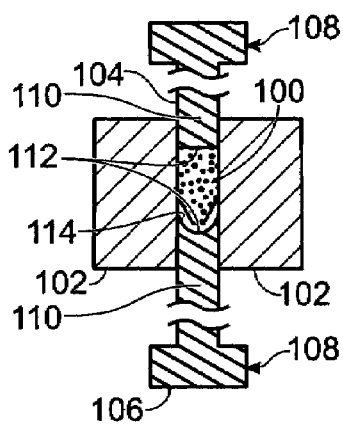 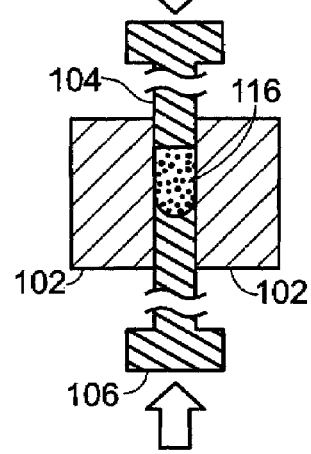 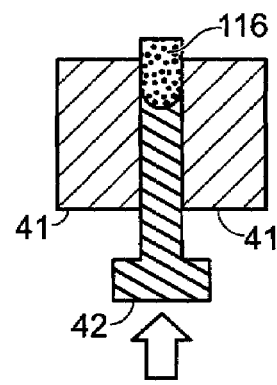
Fig. 14
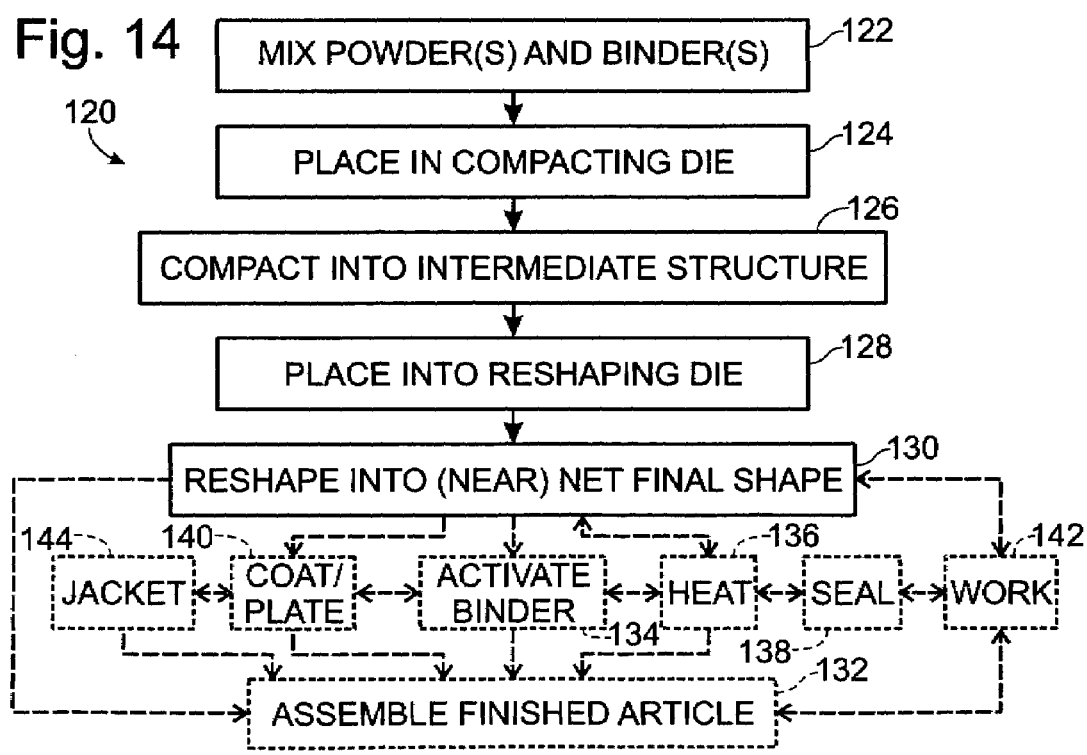

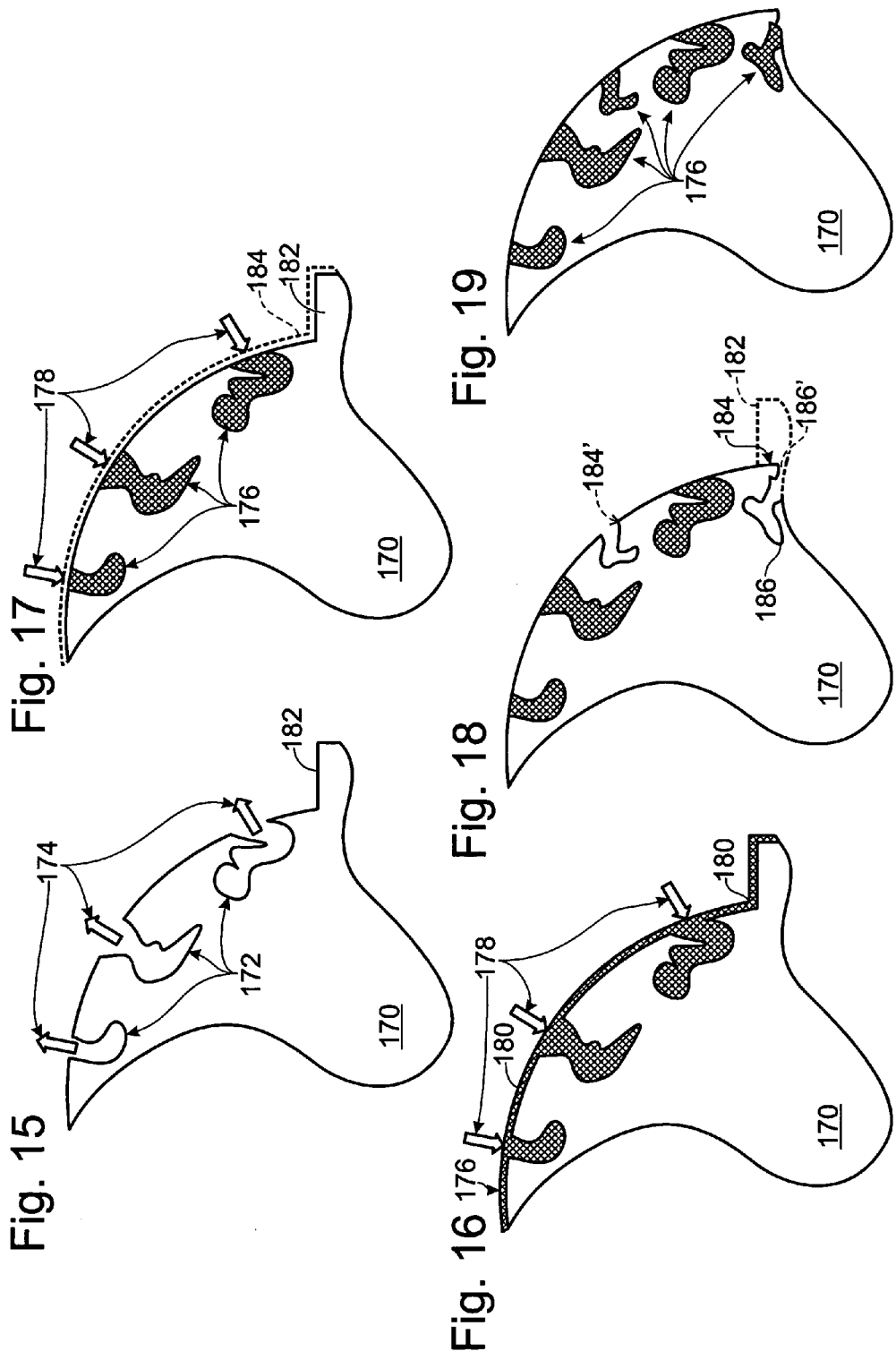

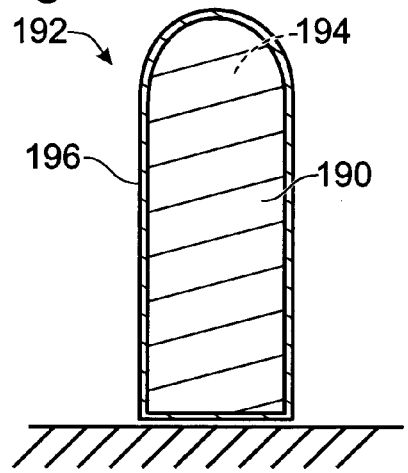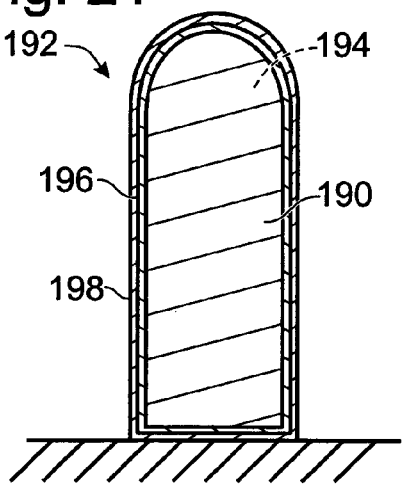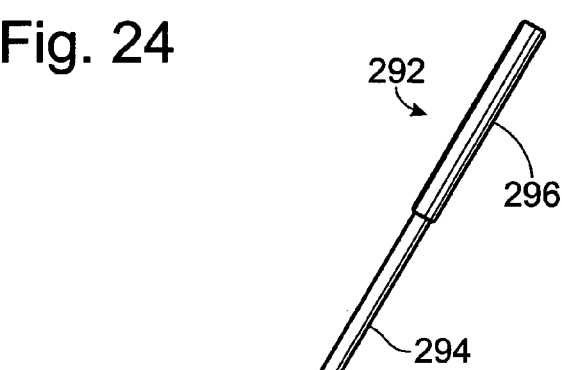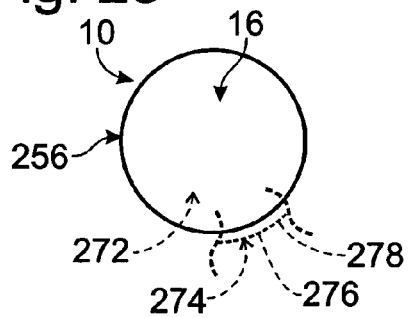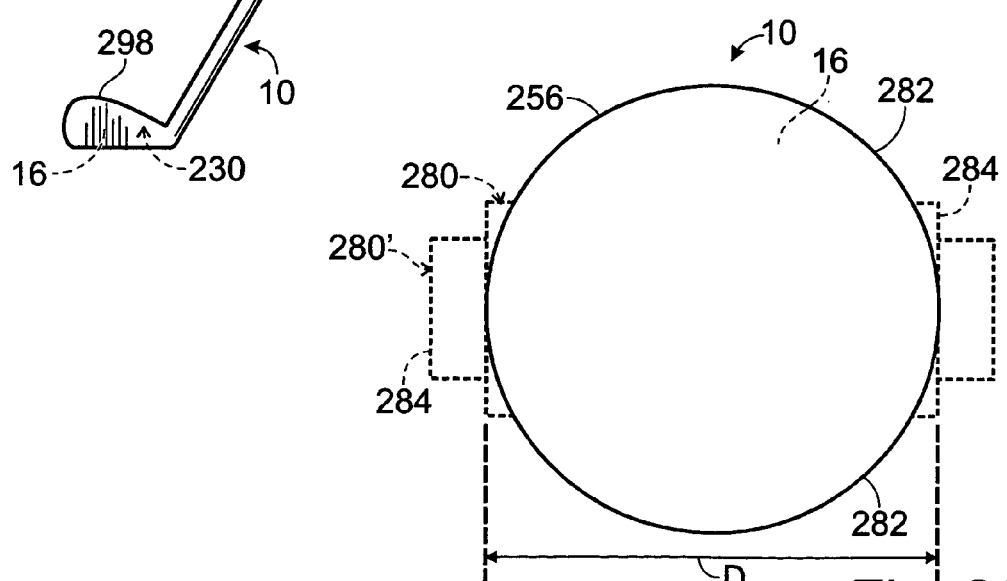

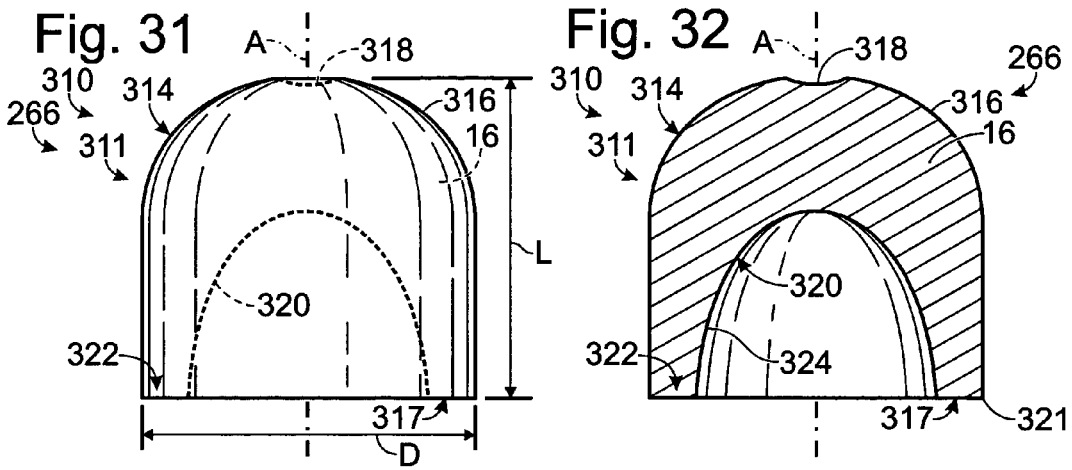
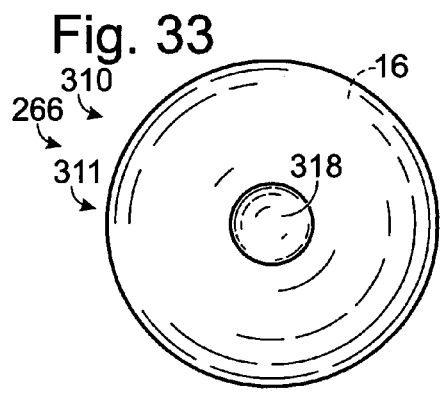
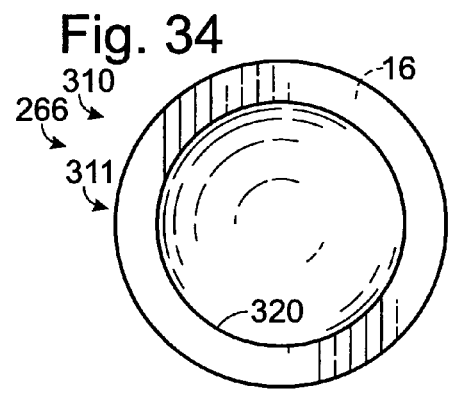
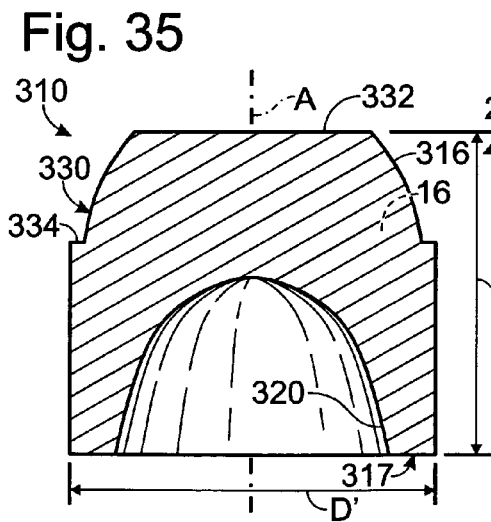
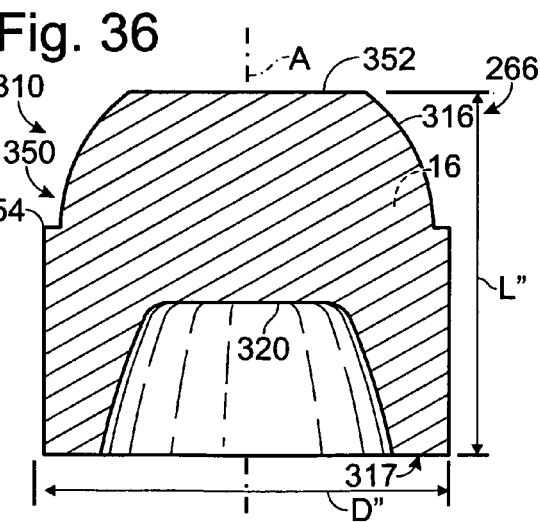

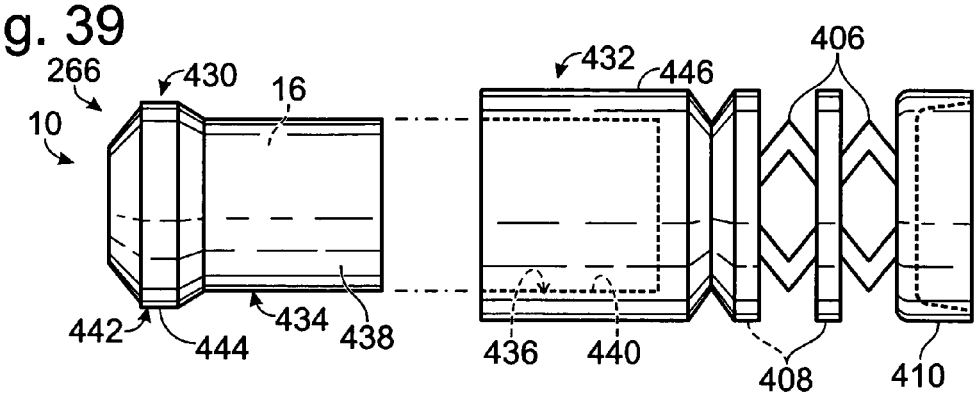
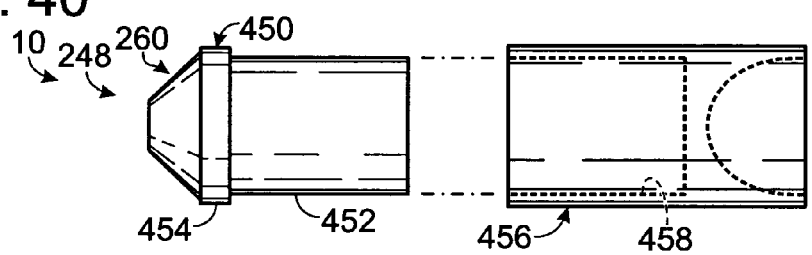
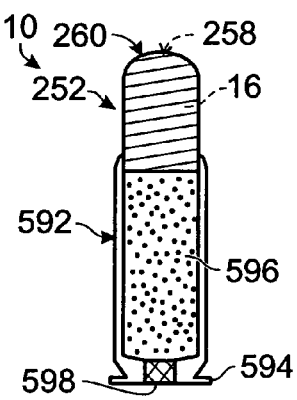
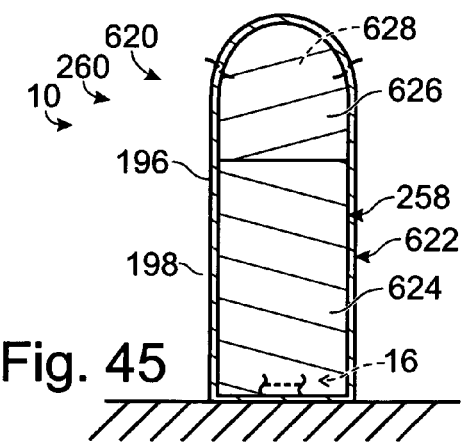
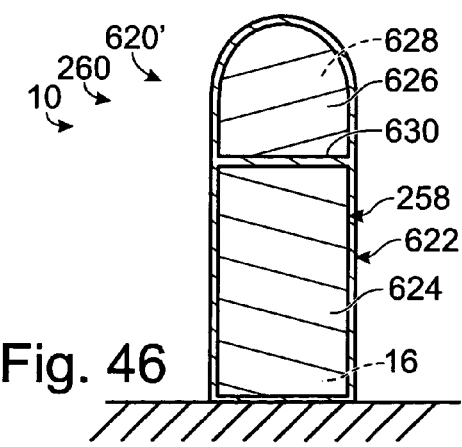

TUNGSTEN-CONTAINING ARTICLES AND METHODS FOR FORMING THE SAME

RELATED APPLICATIONS

This application is a continuation-in-part of and claims priority to similarly-entitled U.S. patent application Ser. No. 10/688,071, which was filed on Oct. 17, 2003, now U.S. Pat. No. 6,823,798, and which is a continuation of PCT Patent Application Serial No. PCT/US03/02579 (filed Jan. 29, 2003, published in English as WO 03/064,961 on Aug. 7, 2003, claims priority to U.S. patent application Ser. No. 10/061,759, which was filed on Jan. 30, 2002, now U.S. Pat. No. 6,749,802, and U.S. Provisional Patent Application Ser. No. 60/423,232, which was filed on Nov. 1, 2002). This application also claims priority to U.S. Provisional Patent Applications Ser. Nos. 60/423,331 (filed Oct. 31, 2002), 60/422,937 (filed Nov. 1, 2002), 60/422,935 (filed Nov. 1, 2002), and 60/462,164 (filed Apr. 11, 2003). The complete disclosures of the above-identified patent applications are hereby incorporated by reference for all purposes.

FIELD OF THE DISCLOSURE

The present disclosure relates to tungsten-containing articles, including firearms projectiles, and to processes, including powder metallurgy processes, for forming tungsten-containing articles.

BACKGROUND OF THE DISCLOSURE

Conventionally, many articles have been produced from lead because of lead's relatively high density (11.3 g/cc) and relatively inexpensive cost. Examples of such articles include firearms projectiles, radiation shields and various weights. More recently, lead substitutes have been sought because of the toxicity of lead. For example, the U.S. Fish and Wildlife Service has banned the use of lead shotgun shot for hunting waterfowl. Various lead substitutes have been used, including steel and bismuth, with each offering various advantages and disadvantages as compared to lead. Other lead substitutes include tungsten or tungsten alloys.

SUMMARY OF THE DISCLOSURE

The present disclosure is directed to tungsten-containing articles, and manufacturing processes for tungsten-containing articles. In some embodiments, the articles are firearms projectiles, such as shot, shot slugs, bullets, big game bullets, lead-equivalent bullets, black powder bullets, and the like. The articles may be formed into firearms cartridges. In some embodiments, the projectiles are frangible, in some they are sealed, in some they are plated, and in some they are jacketed. In some embodiments the article is a lead substitute. In some embodiments, the article has a density in the range of approximately 8 g/cc and approximately 15 g/cc, with subsets of this range including densities less than the density of lead, densities selected to be equal to the density of lead or a lead alloy such as lead-antimony alloys that are commonly used in firearms projectiles, and densities selected to be greater than the density of lead, such as densities in the range of 11.5 g/cc and 15 g/cc or densities of at least 12 g/cc.

In some embodiments, composition of matter from which the tungsten-containing articles are formed includes components in addition to a tungsten-containing component, such as at least one binder, filler material, and/or lubricant.

In some embodiments, the binder includes at least one metallic binder. In some embodiments, the article contains at least one non-metallic binder, such as a polymeric binder. In some embodiments, the article contains both a metallic binder and a non-metallic binder. In some embodiments, the manufacturing processes include compacting the mixture of powders under a first pressure to yield a desired intermediate structure, then reshaping the structure under a second pressure that is lower than the first pressure to yield the desired article. The manufacturing processes include various powder-metallurgy and molten metal processes, and sealing, reforming, intermediate structure, binder-actuating, heat strengthening, sintering, reshaping, plating, working, and/or jacketing steps which may be selectively utilized alone or in combination. The composition of matter preferably is selected to reflow, or be reshaped, without fragmenting or otherwise disintegrating into discrete particles or particulate. In some embodiments, the compacted intermediate and/or final article has an extrusion constant of less than 30,000 psi. In some embodiments, the mixture of powders used to form the article have an ASTM Hall flowmeter reading for fifty grams through a cone (without tapping) of less than 18 seconds.

BRIEF DESCRIPTION OF THE DRAWINGS

FIG. 10 is a schematic diagram showing illustrative examples of compacted intermediate structures according to the present disclosure.

FIG. 11 is a schematic cross-sectional view of a reshaping die loaded with an intermediate compacted structure.

FIG. 12 is a schematic cross-sectional view of the reshaping die of FIG. 11, with the compacted intermediate structure undergoing reshaping.

FIG. 13 is a schematic cross-sectional view of the reshaping die of FIGS. 11 and 12, with the lower punch ejecting a reshaped article.

FIG. 14 is a flowchart illustrating methods for preparing the tungsten-containing articles of the present disclosure.

FIGS. 15–19 are schematic representations of sealing and resealing processes used to form articles according to the present disclosure.

FIG. 20 is a schematic elevation view of a bullet plated according to the present disclosure.

FIG. 21 is a schematic elevation view of a bullet plated and jacketed according to the present disclosure.

FIG. 24 is a schematic side elevation view of a golf club constructed with a golf club weight according to the present disclosure.

FIG. 25 is a side elevation view of a shot pellet constructed according to the present disclosure.

FIG. 26 is a side elevation view of another shot pellet constructed according to the present disclosure.

FIG. 31 is an elevation view of a firearm slug formed from a lead substitute according to the present disclosure.

FIG. 32 is cross-sectional view of the firearm slug of FIG. 31.

FIG. 33 is a top plan view of the firearm slug of FIG. 31.

FIG. 34 is a bottom plan view of the firearm slug of FIG. 31.

FIG. 35 is an elevation view of another firearm slug formed according to the present disclosure.

FIG. 36 is an elevation view of another firearm slug formed according to the present disclosure.

FIG. 39 is an exploded elevation view of another firearm slug and a sabot constructed according to the present disclosure.

FIG. 40 is an exploded elevation view of a black-powder, or musket, round according to the present disclosure.

FIG. 44 is a cross-sectional view of a bullet cartridge constructed in accordance with the present disclosure.

FIG. 45 is a cross-sectional view of another bullet constructed according to the present disclosure.

FIG. 46 is a cross-sectional view showing a variation of the bullet of FIG. 45.

DETAILED DESCRIPTION AND BEST MODE OF THE DISCLOSURE

Figure 1:
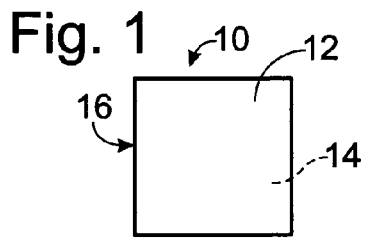
FIG. 1 is a schematic representation of an article constructed from a composition of matter according to the present disclosure.

FIG. 1 schematically shows an article 10, which is at least substantially or completely formed from at least one tungsten-containing component 12, and which typically includes at least one binder, or binder component, 14. For the purpose of simplicity, article 10 is schematically illustrated in FIG. 1 and is meant to graphically and generally represent an article 10 formed according to the present disclosure, with actual articles 10 constructed with virtually any desired shape and size without departing from the scope of the disclosure.

Tungsten-containing powder(s) 12 and binder(s) 14 are mixed together to form a composition of matter 16, from which article 10 is formed. Accordingly, composition of matter 16, and articles formed therefrom, may be described as being at least substantially formed from a tungsten-containing component and, when present, a binder component 14. In some embodiments, composition of matter 16 may be referred to as a non-toxic lead substitute (NTLS) because it has a sufficiently high density to be used to produce articles that conventionally have been formed from lead or lead alloys, but unlike lead, it is not toxic.

Tungsten-containing component 12 will typically be in powder form when mixed with binder component 14, and accordingly will be hereafter referred to herein as tungsten-containing powder 12. As used herein, the term "powder" is meant to include particulate having a variety of shapes and sizes, including generally spherical or irregular shapes, flakes, needle-like particles, chips, fibers, equiaxed particles, etc. Like tungsten-containing powder 12, binder component 14 may also be in powder form, although some embodiments may utilize binders in non-powder form.

Much of the following discussion is directed to firearms projectiles; however, the methods and compositions disclosed herein may be used to form other articles, such as discussed herein in more detail. Similarly, much of the following discussion is directed to powder metallurgy processes and powder-based, or powder-form compositions of matter; however, it is within the scope of the present disclosure to also make the articles and/or otherwise utilize the compositions and selective process steps to form articles from molten tungsten-containing feedstocks, in which the tungsten-containing and other components may be in any suitable form for forming the molten feedstock.

Density

Article 10 generally has a medium- to high-density and may be used for a variety of purposes, such as to form articles that conventionally have been formed from lead. As used herein, "medium-density" is meant to refer to densities in the range of approximately 8 g/cc to 15 g/cc, and "high-density" is meant to refer to densities greater than 15 g/cc, such as in the range of 15 g/cc and 19.3 g/cc (the density of pure tungsten). It is within the scope of the present disclosure that article 10 may have a density in the range of 7.7 g/cc and approximately 18 g/cc, and preferably in the range of approximately 8.5 g/cc and approximately 15 g/cc. When article 10 is intended for use as a lead substitute, the article preferably has a density in the range of approximately 10 g/cc and approximately 13 g/cc, more preferably in the range of approximately 10.5 g/cc and approximately 12 g/cc, and even more preferably a density of approximately 11.1–11.3 g/cc (depending, for example upon whether the article will be a substitute for pure lead, which has a density of 11.3 g/cc, or a lead alloy, such as a lead-antimony alloy having a density of approximately 10.9 g/cc to 11.2 g/cc depending upon the weight percentage of antimony in the alloy).

Article 10 may have a density outside of these illustrative ranges and within further subsets of these ranges. For example, and as discussed in more detail herein, increasing the density of article 10 typically involves at least one of increasing the weight percentage of tungsten-containing powder 12, increasing the weight percentage of tungsten within the tungsten-containing powder, and/or increasing the compaction pressure that is applied to the composition of matter to form the article or a compacted structure that is used as a component of the article.

In view of the above, in some applications it may be sufficient or even desirable to produce an article 10 that has a density that is less than the density of lead, such as a density in the range of 8 g/cc and 11.2 g/cc or a density in the range of 9 g/cc and 11 g/cc. As an example, some weights or radiation shields may be acceptable with a density that is lower than the density of lead. As another example, it may be desirable to produce a firearms projectile that has a density that exactly matches the density of a conventional lead-antimony projectile. Some articles are produced with a density that is equal to the density of lead so that the article has the same weight as a corresponding lead article of the same size.

In some embodiments, article 10 is produced with a density greater than the density of lead, such as a density in the range of 11.5 g/cc to 17 g/cc, a density in the range of 11.5 g/cc to 13 g/cc, a density of at least 12 g/cc, and a density in the range of 12 g/cc and 15 g/cc. An example of an application where a density that exceeds the density of lead may be desirable is in some firearms projectiles. Increasing the density of the projectiles will tend to increase the down-range energy of the projectiles compared to similarly dimensioned projectiles having a lower density. The higher density of such projectiles also provides the option of producing a projectile with a smaller size (in at least one dimension—such as a shorter length) while retaining the same overall weight of a comparable lead or lead-antimony projectile. The design freedom of decreasing at least one dimension of a projectile facilitates constructing projectiles with improved aerodynamics. For example, shorter projectiles that are fired from rifled or other barrels that are adapted to impart considerable spin to the projectiles as the projectiles travel along the barrel may have increased gyroscopic stability compared to a longer projectile of the same overall mass. When higher densities are used to produce more massive projectiles or more aerodynamic projectiles, such projectiles tend to better resist the influence of drag forces during flight when compared to a lead or lead-antimony projectile. In the case of more massive projectiles, the increased mass results in a greater inertia and thus greater resistance to drag forces. In the case of a more aerodynamic projectile, the drag force is reduced, and thus less influential in the trajectory, or flight path, of the projectile. In either case, the reduction in the influence of drag forces increases the down range energy of the projectile.

Tungsten-Containing Components

Tungsten-containing component 12 may take a variety of forms, such as including one or more of pure tungsten (density 19.3 g/cc), a tungsten alloy, tungsten-containing compositions, solid solutions of tungsten and one or more other metals, and combinations thereof. Examples of suitable tungsten alloys are collectively referred to as "WHA's" (tungsten heavy alloys) and typically have densities in the range of approximately 15 g/cc to approximately 18 g/cc, and often have a density of 17 g/cc or approximately 17 g/cc. In the illustrative embodiments described herein, WHA refers to an alloy including tungsten, nickel and iron, such as an alloy comprising 90–93 wt % tungsten, 5–7 wt % or more nickel, 2–3 wt % iron and optionally minor amounts of other components, such as copper, carbon, molybdenum, silicon, etc. Tungsten-containing components are especially well-suited for use in firearms projectiles, weights or other lead substitutes, because they can be mixed with less dense materials, such as binder 14, to produce a medium-density article, with a density in the ranges identified above, including densities at or near (within 0.01–0.5 g/cc) the density of lead (11.3 g/cc), lead-antimony alloys (11.1–11.2 g/cc), or densities greater than lead (12–13 g/cc or greater).

Examples of suitable tungsten alloys include, but are not limited to, W—Cu—Ni, W—Co—Cr, W—Ni—Fe, W—Ni, WC (tungsten carbide), W—Fe (ferrotungsten) and alloys of tungsten and one or more of nickel, zinc, copper, iron, manganese, silver, tin, bismuth, chromium, cobalt, molybdenum and alloys formed therefrom, such as brass and bronze. Medium-density tungsten alloys may also be used as a suitable source of tungsten-containing component 12. For example, other W—Ni—Fe alloys having densities in the range of 10–15 g/cc and more particularly in the range of 11–13 g/cc or approximately 12 g/cc have proven effective, although others may be used within the scope of the disclosure. As discussed, especially for powder metallurgy processes and other applications that utilize a powder-based or powder-form composition of matter 16, the tungsten-containing component will often be present in powder form. The individual tungsten-containing powders may vary in coarseness, or mesh-size. Similarly, the above-presented illustrative examples that include tin may also provide examples of suitable compositions of matter 16 that include a tin-containing metallic binder, as described in more detail herein.

A particularly well-suited tungsten-containing component 12 is ferrotungsten, which typically has a density in the range of 14–15 g/cc. Further examples include powder-based and other components that are derived from ferrotungsten, such as disclosed in U.S. Provisional Patent Application Ser. No. 60/462,164, the complete disclosure of which is hereby incorporated by reference for all purposes. Another example is other compositions that include tungsten and iron. Another suitable tungsten-containing component is WHA (as discussed above), and WHA-containing compositions and alloys, and similar compositions containing at least 80% tungsten, such as 85–95 wt % tungsten with corresponding percentages of iron and/or nickel. Further examples of suitable tungsten-containing powders 12 include tungsten-containing powders that have been high-energy milled with one or more other metallic powders to produce mechanical alloying effects, such as disclosed in U.S. Pat. No. 6,248,150, the complete disclosure of which is hereby incorporated by reference for all purposes.

Still other well-suited tungsten-containing powders 12 are powders produced from recycled tungsten or recycled tungsten alloys, such as waste materials formed when tungsten or tungsten alloys are forged, swaged, drawn, cropped, sawed, sheared, and machined. Operations such as these inherently produce a variety of metallic scrap, such as machine turnings, chips, rod ends, broken pieces, rejected articles, etc., all of which are generated from materials of generally high unit value because of their tungsten content. Illustrative processes for obtaining this powder, and compositions of such powder are disclosed in U.S. Pat. No. 6,447,715, the complete disclosure of which is hereby incorporated by reference for all purposes.

Binders

Figure 2:
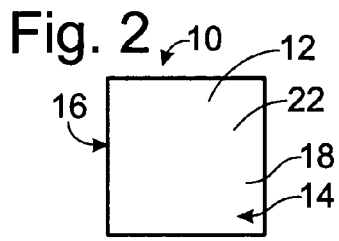
FIG. 2 is a schematic representation of an article constructed from a composition of matter that contains a metallic binder component.
Figure 3:
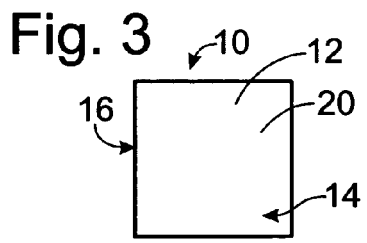
FIG. 3 is a schematic representation of an article constructed from a composition of matter that contains a non-metallic or polymeric binder component.

With the addition of binder, or binder component, 14, the discontinuous-phase of tungsten-containing powder 12 may be formed into a continuous-phase matrix without requiring the tungsten-containing powder to be melted. In other words, binder 14 enables the loose tungsten-containing powder to be formed into an at least relatively defined and durable shape without requiring melting and casting of powder 12. Binder 14 may include at least one of a metallic binder 18 and a polymeric binder 20. Metallic binder 18 and polymeric binder 20 also may be referred to as metallic binder component 18 and polymeric lo binder component 20, respectively. An example of an article 10 that includes a metallic binder component 18 is schematically illustrated in FIG. 2. In FIG. 3, an example of an article 10 that includes a polymeric binder component 20 is shown, and in FIG. 4, an example of an article 10 that includes both a metallic binder component 18 and a polymeric binder component 20 is shown.

Metallic binder 18 typically is added in powder form to tungsten-containing powder 12. The powders are then mixed and compacted during the formation of article 10. Examples of suitable metallic binders include tin and tin-containing powders, as indicated graphically in FIG. 2 at 22. Tin-containing powder 22 may be pure or at least substantially pure tin powder. Tin has a density of 7.3 g/cc. Powder 22 may also include elements other than tin, such as bronze. However, in some embodiments, tin may form at least 40 wt %, and preferably at least 50 wt %, or even at least 75 wt %, of powder 22. A factor that contributes to the ability of tin-containing powder 22 to form an effective binder for article 10 is tin's ability to anneal itself. In other words, tin can be cold worked, or reformed, repeatedly and still establish metallic bonding between itself and tungsten-containing powder 12.

The weight percentage of tin-containing powder 22 in article 10 may vary depending upon such factors as the desired density of the uncompacted and the finished article, the density and amount of other components in the article, the desired strength of the article and the desired flow and ductility of the article. It is within the scope of the disclosure that powder 22 is present in composition 16 in the range of 5 wt % and 60 wt %. In some embodiments, powder 22 will be present in the range of 10 wt % and 50 wt %, in the range of 15 wt % and 40 wt %, and in the range of 20 wt % and 30 wt %. In some embodiments, composition 16 will contain at least 10 wt % of powder 22, in some embodiments composition 16 will contain less than 50 wt % of powder 22, in some embodiments tin-containing powder 22 will form the largest component (by particle weight percentage and/or by elemental weight percentage) in binder 14 and/or composition 16, and in some embodiments, binder 14 and/or composition 16 may be described as containing powder 22 as its majority component.

When article 10 is formed from a molten feedstock and composition of matter 16 still includes a metallic binder component, the binder component may have a non-powder form. In other words, it may be in any available form for melting to form a portion of the molten feedstock.

Non-metallic, or polymeric, binder 20 may include any suitable polymeric material, or combination of polymeric materials. Examples of suitable polymeric binders include thermoplastic resins and thermoset resins, which are actuated, or cross-linked, by heating. The binder-actuation processes and techniques described herein may also be referred to as binder-activation processes and techniques. Examples of suitable thermoset resins are melamine and powder-coating epoxies, and examples of suitable thermoplastic resins are nylon (including nylon 6), polyethylene, polyethylene glycol and polyvinyl alcohol. Other suitable polymeric binders are water-actuated polymers, such as Portland cement, vinyl cement and urea formaldehyde, which are actuated by immersion or other contact with water. Still another example of a suitable polymeric binder is a pressure-actuated polymer, such as gum arabic. Still further examples of polymeric binders that may be used are gelatin powder and stearic acid.

Particularly well-suited polymeric binders are elastomeric, or flexible, epoxies, which are thermoset resins that are suitable for use as corrosion-resistant coatings on rebar. Because rebar is often bent after being coated, its coating must bend with the rebar to provide the intended corrosion resistance. As such, these epoxies are often referred to as "rebar epoxies." Through experimentation, it has been discovered that these epoxies are particularly well-suited for use as a polymeric binder 20 for forming article 10. Examples of suitable elastomeric epoxies for use as binder 20 are sold by the 3 M Corporation under the tradename 3 M 413™ and by the Dupont Corporation under the trade name 2-2709™. It should be understood that other elastomeric or flexible epoxies may be used to form article 10 without departing from the scope of the present disclosure.

Polymeric binder 20 will often comprise in the range of approximately 0.1 wt % and approximately 10 wt % of composition 16, and typically is present in the range of approximately 0.2 wt % and approximately 3 wt %. An example of a subset of this range is approximately 0.25 wt % and approximately 0.65 wt %. Weight percentages outside of this range may be used without departing from the scope of the disclosure; however, the amount of binder is typically rather small because polymeric (and other non-metallic) binders 20 tend to have much lower densities than tungsten-containing powder 12. Accordingly, the greater the percentage of binder 20 in composition 16, the lower the density of the resulting article compared to an article with a lesser amount of the polymeric binder. This is an important consideration to remember, especially as the desired density of article 10 increases. For example, as the amount of binder is increased, it may be necessary to use a greater amount of tungsten-containing powders having higher densities to achieve a desired density in the article formed thereby.

Illustrative, non-exclusive examples of proportions of binders that have proven effective include 1–2 wt % melamine, 1.5–5 wt % Portland or vinyl cement, 2–3 wt % urea formaldehyde, and 2–3 wt % gum arabic, with all or at least a substantial portion of the remainder of composition of matter 16 being formed from tungsten-containing powder 12. It should be understood that these exemplary proportions have been provided for purpose of illustration and that other percentages of these binders may be used.

Polymeric binder, or binder component, 20 may include two or more different types of polymeric or other non-metal binders. For example, a combination of a rigid epoxy and a flexible epoxy may be used to produce an article that has increased strength over a comparable article formed with only a rigid epoxy or only a flexible epoxy. When more than one binder 20 is used, it is preferable that the binders are actuated through the same or compatible mechanisms.

Another example of a suitable binder 14 for composition 16, and articles formed therefrom, is a combination of at least one metallic binder component 18 and at least one non-metallic or polymeric binder component 20. For example, binder 14 may constitute approximately 2–30 wt % of the article or composition of matter, with tungsten-containing powder constituting at least a substantial portion, if not all, of the rest of the composition of matter or article. In such an embodiment, the metallic binder component will typically constitute a majority of the binder, and may constitute as much as 70 wt %, 80 wt %, 90 wt %, or more of the binder. A benefit of binder 14 including both metallic and non-metallic binders compared to only polymeric binders is that some polymeric binders are effective at reducing the brittleness (and/or increasing the strength) of the article but they tend to swell or otherwise expand during actuation of the binder. This expansion decreases the density of the resulting composition of matter or article. However, when binder 14 also includes a metallic binder component 18, such as tin-containing powder 22, this swelling is substantially reduced or eliminated.

As an illustrative example, tin or another tin-containing powder 22 and one or more (flexible and/or rigid) thermoset epoxies have proven effective in experiments. In experiments, a composition of matter was prepared from 78.2 wt % tungsten-containing powder 12, and 21.8 wt % tin-containing powder 22. When 0.2 wt % of the tin-containing powder was replaced with a flexible thermoset epoxy and the resulting composition was actuated, the crushing strength was approximately doubled. When approximately 0.5 wt % of the tin-containing powder was replaced with the epoxy, the crushing strength of the composition was approximately quadrupled. Continuing the above example for purposes of illustration, the same or similar substitutions of polymeric binder component 20 for metallic binder component 18 and/or tungsten-containing powder 12 may be used with other exemplary compositions presented herein without departing from the scope of the present disclosure.

Binder Actuation

Some binders 14, such as many polymeric binders 20 and some metallic binders 18, require actuation to achieve a desired cross-linking, adhesion or other bonding. The particular method of actuating the binder will tend to vary depending upon such factors as the particular binder or binders being used. For example, some binders are actuated by heating. Others are actuated by hydration, still others are actuated by compression, and still others are actuated by chemical reactions/reagents. It should be understood that actuation may, in some embodiments, occur during a compression step, such as when heat or pressure are used to actuate the binder.

Examples of heat-actuated binders include thermoplastic resins and thermoset resins, including rebar epoxies. It has been found that heating articles, and especially smaller articles such as bullets, shot and slugs, at a temperature in the range of approximately 150° F. and approximately 445° F. for a time period in the range of 30 seconds and several hours is effective. Some compositions of matter 16 may have a greater tendency to crack as they are exposed to higher temperatures for longer periods of time, and therefore it should be understood that the temperature and time period may vary depending upon the particular composition being used. Other illustrative temperature ranges for heating of article 10 include heating at a temperature less than approximately 250° F., less than approximately 200° F., and in the range of approximately 150° F. and approximately 175° F. Similarly, heating for less than approximately 15 minutes has proven effective, such as heating for 1–15 minutes with heating for less than approximately 5 minutes being suitable for many applications. It is within the scope of the disclosure that other heating times and temperatures may be used, and that articles 10 may be formed without heating.

Because the particular composition of article 10 will vary depending on the particular powders and binders being used, and relative concentrations thereof, it should be understood that temperatures outside of this range may be effective for a particular article. For example, articles 10 in the form of bullets using melamine as polymeric binder 20 have been effectively cured at temperatures in the range of 340° F. and 410° F. for several minutes without cracking. It should also be noted that curing rebar epoxies at 150–175° F. for approximately 5 minutes has proven effective when these epoxies are used as the polymeric binder 20, despite the fact that these epoxies are normally cured at much higher temperatures when used as rebar epoxies. Binders that contain tin and a rebar epoxy have been effectively actuated by heating at temperatures in the range of 150° F. and 450° F., such as in the range of 200° F. and 390° F. Preferably, compositions that include tin as a metallic binder component are not cured at temperatures that exceed 450° F. or else the tin may segregate or otherwise settle within the article or accumulate on the surface or other exterior portion of the article.

Examples of water-actuated binders include Portland cement, vinyl cement and urea formaldehyde. Typically, the actuation step includes immersion of the articles in water, followed by a drying period. In experiments, the articles were immersed in water from between a few seconds and almost an entire day. For most water-actuated binders, an immersion, or water-compressing, period of less than an hour, and preferably less than a minute and even more preferably approximately 5–10 seconds was sufficient.

Other Optional Components

It is within the scope of the disclosure that article 10 and composition of matter 16 may include components other than tungsten-containing powder 12 and binder 14. As indicated above, the composition containing powder 12 and binder 14 may, but does not necessarily, include a relatively small component, such as less than 1 wt %, or approximately 1 wt %, of a suitable lubricant 24, such as to facilitate easier removal of the bullet from a die. For example, 0.2 wt %–0.5 wt % lubricant has proven effective. Lubricant 24 is graphically illustrated in dashed lines in FIG. 4, but it should be understood that any article 10 may include lubricant 24. As discussed, article 10 and/or composition of matter 16 may be formed without a lubricant. Similarly, when the article is formed with a binder 14 that includes tin-containing powder 22, the powder may provide sufficient lubrication. ACRA-WAX™ and KENOLUBE™ are non-exclusive examples of suitable lubricants.

Figure 4:
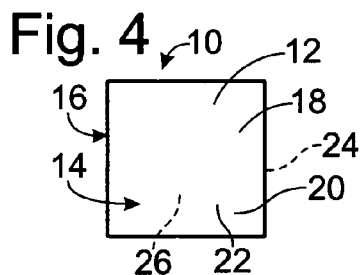
FIG. 4 is a schematic representation of an article constructed from a composition of matter that contains a metallic binder component and a polymeric or non-metallic binder component.

Another example of an optional component of composition of matter 16, and thereby article 10, is a filler material, as graphically indicated in FIG. 4 at 26. Filler material is a component, typically a metal or metallic alloy, that is added to adjust the density of the core and/or reduce the amount of more expensive components that otherwise would need to be added. For example, if the tungsten-containing powder would otherwise produce a core having a density that exceeds 15 g/cc and it would be acceptable to have a core with a density that is less than this density, such as less than 11.5 g/cc, then an appropriate filler material may be added to reduce the amount of tungsten-containing powder that is used. As used herein, "filler material" refers to components that are not binders, lubricants, or tungsten-containing components. Accordingly, it will often not be necessary or desirable to utilize a filler material because the density of the mixture may be selectively adjusted by varying the amount and composition of tungsten-containing component 12 and binder component 14. Illustrative examples of suitable filler materials include iron, iron-containing compounds and alloys that contain iron.

Lubricant 24 and filler material 26 may be selectively included, or excluded, from any of the illustrative compositions described, illustrated and/or incorporated herein. For example, the filler material 26 may be selectively added, with a proportional decrease in the weight percentage of one or more of the other components, to any of the compositions described herein to adjust the density of articles formed from the composition relative to the density that otherwise would be achieved without the addition of filler material. This adjustment will often be a decrease in the density, but it is within the scope of the disclosure that filler material (depending, for example, upon its density and the bulk density of the original composition) may also be used to increase the density of the article. Filler material also may be used to require a higher compaction pressure to obtain a desired post-compaction density, with this increased compaction pressure providing a compacted structure having greater strength than if the density was achieved by compacting a higher-density mixture of powders with a lower compaction pressure.

Although the various components, and variants thereof, that may selectively be included in the powder-based or molten composition of matter from which articles 10 are formed have been separately described herein, it is within the scope of the present disclosure that these components may be added to the composition together, may form part of the same alloy or composition, etc. In other words, it is not a requirement that each component be added as a discrete structure from the other components. While this is within the scope of the present disclosure, it is not required.

Illustrative Compositions

Non-exclusive examples of suitable compositions for medium-density compositions and/or articles include the following: 100 g of WHA/Fe (73.64% WHA/26.36% Fe), 161 g of WHA, 4–8 g binder; 50 g WHA/Fe (73.64% WHA/256.36% Fe), 80.5 g WHA, 4 g 3 M 413™ and 0.27 g lubricant; 65.25 g WHA, 65.25 g FeW (73.64% WHA/256.36% Fe), 4 g 3 M 413™ and 0.27 g lubricant; 130.5 g FeW, 3.5 g 3 M413™ and 0.27 g lubricant; and 116.5 g FeW, 14 g Fe, 2.4 g 3 M 413™ and 0.27 g lubricant. Still further examples of suitable compositions for composition of matter 16 include powders formed from 73.64% WHA and 26.36% iron; 70% WHA and 30% zinc; 80% WHA and 20% zinc; 80% WHA, 19% zinc and 1% lubricant; 68% WHA and 32% copper; 68% WHA, 31.5% copper and 0.5% lubricant; 70% WHA and 30% tin; 70% WHA, 29.5% tin and 0.5% lubricant; 15 % WHA, 21.8% tin, 63% ferrotungsten (FeW), and 0.2% lubricant; 35–40% FeW, 31% nickel, and 29–34% WHA (and optionally 0–0.5% lubricant); 50–60% WHA, 21.8% tin, 18–28% FeW, 0.2% lubricant; 40% FeW, 15% tungsten (W), 23% WHA, 21.8% tin, 0.2% lubricant; 55% W, 12.6% WHA, 10.8% FeW, 21.4% tin, 0.2% lubricant; 80% FeW, 19.75% tin, 0.25% lubricant; 29.8% W, 43.9% FeW, 26.1% tin, 0.2% lubricant; 40% W, 30% FeW, 10% WHA, 19.75% tin, 0.25% lubricant; and 71.1% FeW, 28.7% tin, and 0.2% lubricant. Unless specifically identified to the contrary, it should be understood that all composition percentages identified herein are weight percentages.

The following table provides illustrative examples of compositions 16 and resulting densities of articles 10. The examples are presented in table-form to provide illustrative, non-limiting examples. For example, only ferrotungsten and (90W7Ni3Fe) WHA tungsten-containing powders 12 and at least essentially pure tin powder as tin-containing powder 22 for metallic binder component 18 are shown in the table. However, other tungsten-containing powders 12, including pure tungsten and tungsten carbide, and other tin-containing powders may be used. Similarly, compositions 16 and/or articles 10 may include additional components as well, such as powders of other metals or metal alloys. For example, iron powder may be added to reduce the density of the article that otherwise would have a density greater than that of iron. Non-exclusive examples of other suitable compositions that may be used to form article 10 are disclosed in U.S. patent application Ser. No. 10/041,873, filed Jan. 7, 2002, and entitled "Tungsten-Containing Articles and Methods for Forming the Same," the complete disclosure of which is hereby incorporated by reference for all purposes.

TABLE 1

Densities of Compositions and Articles Produced from Tin- and Tungsten-Containing Powders

| W powder | FeW powder | WHA powder | Tin Powder | Lubricant | Density (g/cc) |
|---|---|---|---|---|---|
| 0 | 58 | 20 | 21.8 | 0.2 | 11–11.7 |
| 0 | 68 | 10 | 21.8 | 0.2 | 11.2 |
| 0 | 78 | 0 | 21.8 | 0.2 | 11–11.7 |
| 0 | 78 | 0 | 22 | 0 | 11 |
| 0 | 38–78 | 0–40 | 21.8 | 0.2 | 11+ |
| 0 | 0 | 68 | 31.5 | 0.5 | |
| 0 | 0 | 70 | 29.5 | 0.5 | |
| 0 | 0 | 75 | 24.5 | 0.5 | |
| 0 | 66 | 0 | 34 | 0 | 10–10.25 |
| 0 | 48–43 | 30–35 | 22 | 0 | 11.5–11.7 |
| 0 | 38–28 | 40–50 | 22 | 0 | 12 |
| 0 | 0 | 78 | 22 | 0 | 12.8–13 |
| 0 | 10 | 0 | 90 | 0 | 7.68 |
| 0 | 20 | 0 | 80 | 0 | 8.067 |
| 0 | 50 | 0 | 50 | 0 | 9.729 |
| 0 | 0 | 10 | 90 | 0 | 7.74 |
| 0 | 0 | 20 | 90 | 0 | 8.24 |
| 0 | 0 | 50 | 50 | 0 | 10.2 |
| 0 | 30 | 40 | 30 | 0 | 10.92 |
| 0 | 43 | 35 | 21.8 | 0.2 | 11.5–.7 |
| 0 | 43 | 35 | 22 | 0 | 11.7–11.9 |
| 0 | 63 | 15 | 21.8 | 0.2 | 11.3 |
| 0 | 18–28 | 50–60 | 21.8 | 0.2 | 12 |
| 58 | 0 | 0 | 42 | 0 | 10.58 |
| 70 | 0 | 0 | 30 | 0 | 11.55 |
| 0 | 71.1 | 0 | 28.7 | 0.2 | 10.8 |
| 0 | 80 | 0 | 19.75 | 0.25 | 11.0 |
| 55 | 10.8 | 12.6 | 21.4 | 0.2 | 11.95–12.61* |
| 29.8 | 43.9 | 0 | 26.1 | 0.2 | 12.0 |
| 40 | 30 | 10 | 19.75 | 0.25 | 12.0 |
| 15 | 40 | 23 | 21.8 | 0.2 | 11.1–11.64* |

*with compaction pressures of 50 ksi–100 ksi

Illustrative Particle Sizes

The size of the individual particles of the components of composition 16 may vary. In the context of at least firearms projectiles in which binder 14 includes tin-containing powder 22, a nominal (average) particle size of 150 mesh has proven effective for powder 22 . Similarly, tin-containing powder 22 having a nominal size of 80 mesh, with no more than 75% being minus 325 mesh has also proven effective. Suitable tin-containing powder is available from Acupowder, Inc. and sold under the trade name Acu-150™. Another suitable tin-containing powder sold by Acupowder, Inc. is coarser than Acu-150™ powder and is sold under the trade name 5325™. Similarly, tungsten-containing powder 12 in the form of ferrotungsten powder having a particle size of minus 100 mesh, minus 140 mesh and minus 200 mesh has proven effective, with less than 10–12% minus 325 mesh being particularly effective. Ferrotungsten powder having a median particle size of approximately 75–125 micron has also proven effective, especially (but not exclusively) when less than 20% of the ferrotungsten powder has a particle size in the range of 45–75 micron and/or when less than 5% of the ferrotungsten powder has a particle size that is less than 75 micron. Tungsten-containing powder 12 in the form of WHA powder having a size of minus 40 mesh has proven effective. When WHA powder that is coarser than approximately 100 mesh (150 micron) is used, it preferably forms less than 20 wt % of composition of matter 16, although a greater weight percentage of this WHA powder is still within the scope of the disclosure. 25.4 micron tungsten powder has proven effective, although other sizes may be used and are within the scope of the disclosure.

The particle sizes presented herein are presented for purposes of illustration and not limitation. Similarly, the acceptable particle sizes may vary depending upon the particular mix and composition of powders used to form composition 16, as well as the particular shape, size and/or application of the article to be formed. In some embodiments, it may be desirable for the lower density powder(s) to be finer than the higher density powder(s) to discourage separation of the powders after mixing but prior to compaction.

Flowability

Especially when article 10 is formed from powder-based components, it will often be desirable to produce the articles through various automated processes and/or with various automated or otherwise mechanical dispensers and/or distribution equipment. As such, the flowability of the powders is a consideration. A reason for considering the flow properties of the composition of matter is that it is difficult to effectively produce articles 10 in quantity when the composition of matter is difficult to transport or otherwise dispense into the molds or dies used to form the articles. For example, a powder-form, or powder-based, composition of matter 16 that produces an effective article 10 (i.e, has a desired density, strength, etc.) may still not be suitable for commercial application if the powder tends to clog or otherwise not flow through dispensers or other processing equipment that is used to dispense the powder to and/or into dies or other compaction chambers. When article 10 is formed by filling a die with a powder-based composition of matter 16, it is desirable for the non-compacted mixture of powders to have sufficient flowability to readily fill the dies that give the articles their shapes. Preferably, composition of matter 16 will have an ASTM Hall flowmeter reading (for 50 grams flowing through a metal cone with no tapping) of less than 18 seconds, and even more preferably a reading of less than 16 seconds, or even less than 14 seconds.

Ferromagnetism

Composition of matter 16 may be ferromagnetic or non-ferromagnetic, depending upon the particular compositions and weight percentages of the tungsten-containing powder 12 used to form the composition of matter. When the composition is ferromagnetic, it may be recovered using a magnet, which may be beneficial in applications in which the article is propelled away from a user during use and/or fragmented during use, such as in the context of articles in the form of firearms projectiles and fishing weights. Ferromagnetism may also be used to distinguish a ferromagnetic lead-substitute article 10 from a lead product.

Processing Techniques

Article 10 is formed from a composition of matter 16 that is at least substantially, if not completely, formed from tungsten-containing component 12 and binder 14, which are combined via any suitable mechanism. For example, in the case of articles 10 to be formed via powder metallurgy, any suitable mechanism may be used to grind, size, blend and/or otherwise prepare tungsten-containing powder 12 and the particular type or types of binder 14 being used. Illustrative and non-exclusive examples of suitable combination mechanisms include blenders, such as a V-cone blender, and grinding mills. When binder 14 includes a metallic binder component 18, a high-energy mill or attritor may optionally be used to obtain mechanical alloying effects, such as described in U.S. Pat. No. 6,248,150, the complete disclosure of which is hereby incorporated by reference for all purposes.

As described in more detail herein, forming article 10 from composition of matter 16 may include compacting the composition to form an intermediate structure having generally the desired density of the article to be produced but a different shape from the article to be produced. The intermediate structure may then be reformed, or reshaped, by compression to form an article having a shape that is different from the shape of the intermediate structure. In some embodiments, the intermediate structure and article will have the same density. In others, they will have densities that differ by less than 1 g/cc and preferably, less than 0.05 g/cc, or even less than 0.02 g/cc or 0.01 g/cc. Furthermore, in some embodiments, composition of matter 16 will be compacted directly into a desired final configuration, without first being shaped into an intermediate shape.

Figure 5:
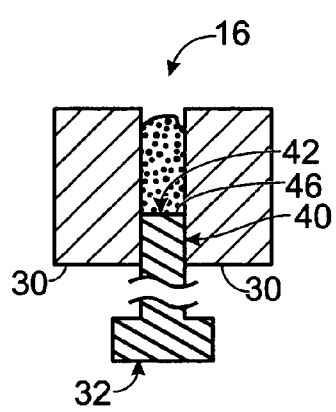
FIG. 5 is a schematic cross-sectional view of a die loaded with a mixture including a tungsten-containing powder and a binder.
Figure 6:
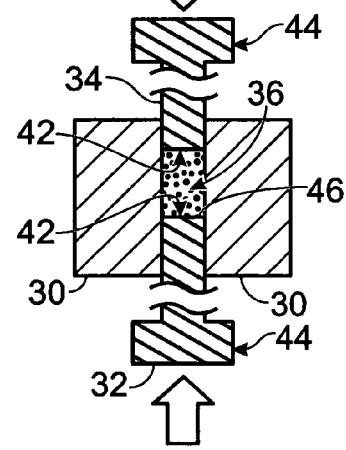
FIG. 6 is a schematic cross-sectional view of the die of FIG. 5, with the mixture undergoing compaction with upper and lower punches to form an intermediate structure.
Figure 7:
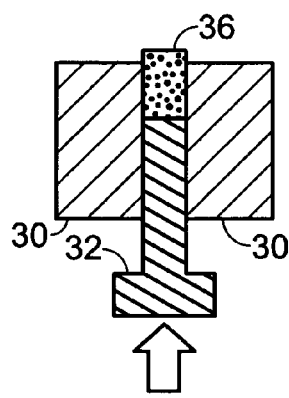
FIG. 7 is a schematic cross-sectional view of the die of FIGS. 5 and 6, with the lower punch ejecting the intermediate structure.

FIGS. 5–7 illustrate an exemplary compaction process for forming a compacted intermediate structure from a powder-form composition of matter 16 according to the present disclosure. The punches, dies and other structure shown in FIGS. 5–7, as well as elsewhere herein, have been schematically illustrated. Accordingly, the relative dimensions of the dies and punches, the throw lengths of the punches, the depths of the dies, etc. may vary without departing from the scope of the disclosure. In FIG. 5, a composition 16 has been placed in a first die 30 that includes a lower punch 32. After the desired amount of composition 16 has been placed in the first die, a second, or upper punch 34 is placed in position, as schematically illustrated in FIG. 6, and compacting pressure is applied to the composition to yield a compacted intermediate structure 36. In FIGS. 6 and 7 and in many of the illustrative examples shown and described herein, intermediate structure 36 is a blank or other intermediate shape that is used to form an article in the form of a firearms projectile. For example, the intermediate structure may have at least one flatter face, pronounced shoulder and/or shorter length compared to the article produced therefrom. However, and as also described in more detail herein, it is within the scope of the disclosure that the methods and compositions described herein may be used to form a variety of articles and should not be limited only to firearms projectiles.

The pressure applied during the compacting step may vary, but is typically high enough to consolidate the loose powder into a solid structure while reducing the microporosity of the composition, and concomitantly increasing the density of the composition. Although the compaction and reshaping processes are graphically illustrated as utilizing a single die with both an upper and a lower punch, this arrangement is not required, and numerous variations may be made without departing from the scope of the disclosure. For example, the compaction step may be accomplished with a die having a cavity with a single opening and a single punch, or a multi-piece die in combination with one or two punches, or even a multi-cavity die with multiple single- or double-acting punches. Furthermore, the precise size and shape of the die and/or punches may be modified to yield a desired article or intermediate structure. Generally speaking, the manufacturing process is simplified by using a die having a cavity with generally opposed openings and a pair of punches that are respectively adapted to be inserted into the openings.

It should be understood that the dies and punches illustrated herein are shown somewhat schematically, and that the precise shape, size and configuration of these components may vary. For example, the sizing and shape of the die and/or punches may vary depending upon the type and shape of structure or article to be produced therein, the amount of pressure to be applied, etc. As used herein, the term "punch assembly" will be used to refer to the punch or punches that ate adapted to be inserted into a die, such as to form structure 36 or the subsequently described near final net shape or final net shape articles. Each punch may be described as having a head 40 that includes a face 42 that is adapted to contact, or otherwise compress, the composition/intermediate structure as the punch assembly is used to apply pressure, as indicated in FIG. 5. The punch or punches may be collectively referred to as constituent elements of a compaction punch assembly 44, and the faces 42 may be referred to as mixture-compressing faces, as indicated in FIG. 6. In the illustrative example shown in FIG. 6, the mixture-compressing face has a flat shape. It is within the scope of the disclosure that mixture-compressing faces may have other configurations, such as only substantially flat faces, concave faces, convex faces, or other faces designed to produce a desired intermediate structure 36.

Compaction and consolidation of composition 16 typically involves an applied pressure of approximately 40,000 lbs/in$^2$ or more, such as to achieve adequate consolidation of the composition and/or to achieve a desired density that is near or above the density of lead. More typically, the applied pressure is often greater than approximately 50,000 lbs/in$^2$ (psi), and in some embodiments may be greater than approximately 65,000 lbs/in$^2$, or even 75,000 lbs/in$^2$. In some embodiments, the compaction pressure may be selected to be at least 80,000 lbs/in$^2$, 90,000 lbs/in$^2$ or even 100,000 lbs/in$^2$ or higher. Compaction pressures that are less than 80,000 lbs/in$^2$, such as pressures in the range of 40,000 lbs/in$^2$ and 80,000 lbs/in$^2$, or 45,000 lbs/in$^2$ and 60,000 lbs/in$^2$, have also proven effective, especially when used to form intermediate structures with the reforming process described herein. It should be understood that there is at least some relationship between the applied compaction pressure and the density of the resulting structure. Structure 36 may be formed with essentially any selected density, depending upon the make-up of composition 16 and the amount of applied pressure. Typically, structure 36 will have a density of at least 8 g/cc, and often will have a density of at least 9 g/cc or at least 10 g/cc. For example, structure 36 may have a density in the range of 10 g/cc and 13 g/cc, a density in the range of 11 g/cc and 11.5 g/cc, a density that is equal to or near the density of lead, or a conventional lead alloy, and as a further example, that structure 36 has a density that is greater than lead, such as a density that is greater than 11.5 g/cc, 12 g/cc or more.

The following table presents illustrative examples of compacted intermediate structures 36 having a variety of densities, such as depending upon the make-up of composition 16 and the amount of applied pressure.

TABLE 2

Illustrative Compositions and Densities for Intermediate Structures at Selected Compaction Pressures

| Composition (wt %) | Density after 48300 psi | Density after 58000 psi | Density after 67600 psi | Density after 77300 psi |
|---|---|---|---|---|
| 78 FeW<br>21.8 Sn<br>0.2 wax | 11.1 | 11.1 | 11.3 | 11.3 |
| 68 FeW<br>10 WHA<br>21.8 Sn<br>0.2 wax | 11.2 | 11.3 | 11.5 | 11.6 |
| 58 FeW<br>20 WHA<br>21.8 Sn<br>0.2 wax | 11.3 | 11.4 | 11.6 | 11.7 |

After compaction (or densification), the intermediate structure typically is removed from the die, such as by removing one of the punches and ejecting the structure from the die by advancing the opposing punch 32. It should be understood that in many embodiments it is possible to remove structure 36 from either direction, depending for example upon which punch is removed first. In some embodiments, such as discussed with respect to FIG. 9, the die is configured to have structure 36 ejected from a single direction.

In order to withstand the pressures that may be required to achieve the desired density in structure 36, punches 32 and 34 may be formed from or include tungsten carbide. This is particularly true where tungsten-containing powder 12 includes ferrotungsten, which is particularly hard and abrasive. However, although tungsten carbide is very hard, it may be somewhat brittle. Therefore, in some embodiments, punches 32 and 34 are shaped so as to avoid thin edges that may fail under high compression loads. Typically, die 30 and punches 32 and 34 are configured so as to produce an intermediate structure 36 that has rotational symmetry around an axis that is coincident with the vector of the applied compression. Put another way, intermediate structure 36 is typically shaped so that it has a substantially circular cross-section along every plane orthogonal to the vector along which compression was applied.

Figure 8:
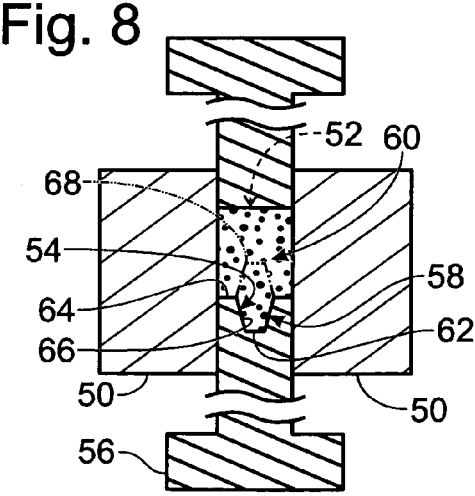
FIG. 8 is a schematic cross-sectional view of a die loaded with a mixture of powders undergoing compaction with upper and lower punches to form another intermediate structure.

As illustrated in FIGS. 5–7, die 30 and punches 32 and 34 are configured to produce an intermediate structure 36 that is at least substantially a right cylinder in shape. Die 30 defines an at least substantially cylindrical void, with punches 32 and 34 having circular faces that are flat or at least substantially flat. In FIG. 8, another illustrative die 50 is shown, with the die defining a tubular void, or cavity, 52. As also shown in FIG. 8, the face 54 of punch 56 is shaped so that the corresponding end region 58, of intermediate structure 60 includes a projecting frustoconical section 62. Thin edges, or "knife-edges" along the perimeter of the face of punch 56 are avoided by including a lip or shoulder at the base of the frustoconical section. Where such features are present, the lip or shoulder is preferably at least approximately 0.01 inches wide, and in some embodiments may be 0.02 inches wide or more.

As also shown in the illustrative embodiment shown in FIG. 8, mixture-compressing face 54 includes an edge region 64 that defines the above-described shoulder. In the illustrated embodiment, edge region 64 extends generally transverse to the direction in which the compaction pressure is applied to composition 16, but the edge region may extend generally toward or away from the other punch and/or have linear or curved configurations. As also shown in FIG. 8, face 54 includes a recess 66 internal of edge region 64. When used to form structure 60, face 54 produces an intermediate structure having a corresponding projecting region that is defined at least in part by the shape of recess 66. As indicated in dashed lines, face 54 may include an internal projection, or hollow portion 68, in which case structure 60 would have a corresponding recess that is defined at least in part by the projection. Although only one of the punches shown in FIG. 8 includes such a shaped face 54, both punches may include faces with projections or recesses, and the face(s) may include projections or recesses with configurations other than those illustrated without departing from the scope of the disclosure.

Figure 9:
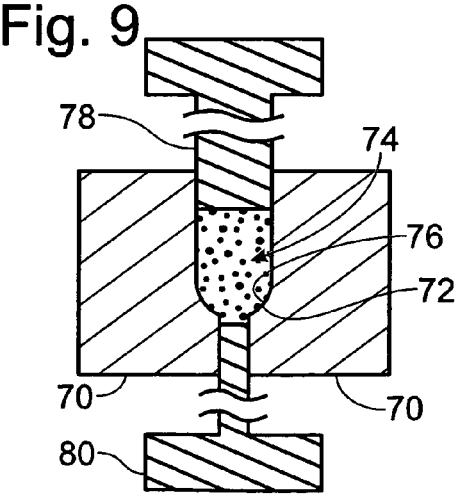
FIG. 9 is a schematic cross-sectional view of a die loaded with a mixture undergoing compaction with upper and lower punches to form still another intermediate structure.

Another example of a suitable die and compaction punch assembly is shown in FIG. 9 and demonstrates an example of a die, which itself further defines at least a portion of the desired shape of an end region 72 of the intermediate structure 74. As shown, die 70 includes a neck 76 that defines at least a portion of end region 72, which as shown takes the form of a bullet or bullet core. In the illustrative embodiment, neck 76 imparts a tapered or curved shape to end region 72, while punches 78 and 80 retain at least substantially flat faces. Such dies may be designed to produce other shapes, including structures with hollow portions, such as indicated at 68 of FIG. 8. A benefit of such a configuration is that both punches have at least substantially flat faces, which tend to be more durable and less expensive than shaped punches, and that some desired intermediate structures may include features that would otherwise require a very thin or knife-edged punch. However, die 70 may be more expensive and/or less durable than a corresponding die having cylindrical or otherwise uniform cross-sectional cavities, as shown in FIGS. 5–8.

By varying the size and shape of the die, and the shape and size of the punches (and corresponding faces), a broad variety of intermediate structures may be pressed to the desired density. FIG. 10 shows examples of such intermediate structures, including a structure 82 having a right cylindrical configuration, a structure 84 with a face that is substantially convex, a structure 86 with a face having a lip and a frustoconical section, a structure 88 having a substantially frustoconical face, and a structure 90 having a substantially convex face with an additional projection or irregularity arising from the pressing process, as provided for in FIG. 9.

Prior to placing the composition of matter into a die or other mold, the die or mold may be lubricated to facilitate easier removal of the compacted article. Any suitable die lubricant may be used. The lubricant may additionally or alternatively be mixed with the powders prior to compaction. Examples of suitable lubricants are ACRAWAX™ dry lubricant, KENOLUBE™, and stearic acid, but others may be used. Generally, the addition of a lubricant to the powders decreases the density of the compacted article. Typically, but not exclusively, non-metal lubricants are only present in less than 2 wt %, and often less than 0.5 wt % (such as 0.05–0.3 wt %).

However, article 10 may optionally be formed without the addition of a lubricant to the composition of matter and/or without lubricating the dies. More specifically, some metallic binder components, such as tin-containing powder 22, not only bind the tungsten-containing powder together, but also provide sufficient lubrication. In other words, article 10 may be produced entirely from metal powders, without requiring the addition of wax, polymers or other lubricants or non-metallic binders. Typically, tin-containing powder 22 is present in at least 10 wt % to obviate the need for a lubricant. It is also within the scope of the disclosure that other relatively soft metals, such as copper, may be used as a metallic lubricant and binder.

Reforming

Once an intermediate structure having a desired density (or a density that is near, such as within 0.1–0.3 g/cc, a desired density) has been formed, that structure may be reshaped at a lower applied pressure into a desired article having a net final shape or near net final shape. By "net final shape," it is meant that the article has the appropriate shape for its intended use, or for assembly into a finished article, with no further machining or reshaping. By "near net final shape," it is meant that the article requires only minor working or machining in order to obtain the appropriate shape for its intended use, or for assembly into a finished article. Such minor working or machining includes, without limitation, sanding, polishing, grinding, buffing, or other finishing processes. Similarly, the drilling of cavities, threaded receivers, slots, or other fine structure in the article is also considered minor working or machining in an article of near net final shape.

When intermediate structures, such as the illustrative examples shown above in FIGS. 5–9 at 36, 60, and 74, undergo a reforming or reshaping process, the intermediate structures may also be described as being blanks, in that they may each be reformed into a variety of (near) net final shapes. Accordingly, such intermediate structures may also be described as having different shapes than the article produced during the reshaping step. For example, the article may be longer, shorter, more or less pointed, more or less curved, may have a greater or narrower shoulder, may have a greater or narrow diameter, etc.

During the reshaping, or reforming, step, the pressure applied to the intermediate structure should be high enough to break and/or deform, and then rebind, the powder matrix formed during the compaction step, without any, or only minimal, loss of density or decrease in structural integrity of the desired article. Accordingly, the applied pressure for this step will tend to vary depending upon the particular configuration of the intermediate structure, the (near) net final shape of the article to be produced, the make-up of composition 16, the desired density of the article to be produced, etc. As an illustrative example, when forming a firearms projectile having a density of at least 10 g/cc, and preferably near or equal to the density of lead, the applied pressure during the reshaping step is typically greater than 25,000 lbs/in$^2$, such as in the range of approximately 35,000 lbs/in$^2$ and approximately 50,000 lbs/in$^2$, and in many embodiments is preferably greater than 45,000 lbs/in$^2$. In order to avoid the deleterious effects of extremely high pressure on the tools used, it is preferred that the reshaping pressure is less than approximately 75,000 lbs/in². The reshaping pressure will typically be less than the compaction pressure used to form the intermediate structure.

The reshaping pressure to be applied tends to vary with how close the intermediate structure is to the desired net final shape. Although an intermediate structure that is a right cylinder is preferred in terms of ease of manufacturing and stress on the punches and dies during the compacting step, a right cylinder must typically undergo comparatively more "flow" upon reshaping to produce an article having a projecting face, such as the nose of a bullet. In contrast, attempting to press an intermediate structure with a pronounced projecting face will typically require comparatively more expensive and fragile tungsten carbide punches and/or dies that incorporate thin edges or features, which often lead to earlier failure of the tools. An example of an intermediate structure that draws from the benefits of both of these approaches is a shape that is in between a right cylinder and the shape of the desired article. In the case of an article that is a bullet, such a shape typically includes a face having a conical or frustoconical surface, so that relatively less flow is required to achieve the desired shape of the final article. However, and as discussed herein, a variety of shapes may be used.

An illustrative example of a (near) net final shape article formed by reforming an intermediate structure according to the present disclosure is shown in FIGS. 11–13. In FIG. 11, intermediate structure 100 is placed in die 102 with opposing punches 104 and 106. Punches 104 and 106 may collectively be referred to as constituent elements of a reshaping punch assembly 108. Similar to the above discussion with respect to compaction punch assembly 44, reshaping punch assembly 108 may include one or more punches, which each include a head 110 and a face 112 that is adapted to engage, or otherwise compress, the intermediate structure as the reshaping pressure is applied to reform the structure into an article according to the present disclosure. Accordingly, the faces may be referred to as structure-compressing faces. In the illustrative example shown in FIG. 11, one of the structure-compressing faces has a flat shape and the other has a concave shape with an edge region 114 that forms an acute angle with the body of the punch. Because the reshaping pressure is lower than the compaction pressure, the reshaping punch assembly may include thinner, or even knife-edged punches without experiencing, or without experiencing to the same degree, the strength and brittleness issues faced with the compaction punch assembly. In some embodiments, edge region 114 may extend generally toward or away from the other punch and may have a relatively thin thickness measured transverse to the direction upon which the punch is urged into the die. For example, edge region 114 may have a radial thickness of 0.01 inches or less, including a radial thickness of 0.005 inches, or less.

FIG. 12 shows a reshaped article 116, which is reshaped at a relatively low pressure by punches 104 and 106 from intermediate structure 100. As shown in FIG. 13, reshaped article 116 is typically dislodged from the die in a fashion similar to that of the intermediate structure, such as by advancing one of the punches to eject the article from the die. The die used in the reshaping process may be the same die used in the compaction process (although with at least one different punch), however, a different die and press is typically employed for reshaping for reasons of manufacturing efficiency. For example, the compacting die is typically equipped with a powder feed mechanism, while the reshaping die is typically equipped with a mechanism to feed the intermediate structure. Additionally, as the pressure demands of each press are substantially different, individual presses having different pressure tolerances may be used for each step. Similarly, different materials of construction may be used for the various dies and/or punches used for the compaction and reforming steps.

Extrusion Constant

To be effectively reformed, the compacted composition of matter is preferably sufficiently ductile to be reshaped without crumbling or otherwise deteriorating into powder or discrete pieces. Accordingly, the compacted composition of matter preferably plastically deforms while retaining its strength and structural integrity. A measure of the reformability of a composition of matter is the extrusion constant for that composition. The extrusion constant for a particular composition correlates the pressure required to extrude a first cross-sectional area of an article formed from the composition to a second cross-sectional area. Expressed in terms of cylindrical structures, the extrusion constant enables the pressure required to extrude a cylinder having a first diameter to a cylinder having a second (smaller) diameter.

More specifically, if P is the extrusion pressure in psi, A is the original cross-sectional area, A' is the extruded cross-sectional area, and k is the extrusion constant, then $$P = k \ln(A/A')$$

In experiments, the extrusion constants of various compositions, including compositions of matter 16, were compared by forming right cylinders with 0.348-inch diameters from the compositions and extruding the cylinders to a diameter of 0.156 inches. The results are summarized below:

TABLE 3

Illustrative Extrusion Constants

| Composition (wt. %) | Density (g/cc) | k (psi) |
|---|---|---|
| pure lead | 11.3 | 6,543 |
| lead alloyed with 1% antimony | 11.2 | 11,840 |
| lead alloyed with 2% antimony | 11.1 | 14,457 |
| 58% W, 42% Sn | 10.58 | 27,482 |
| 70% W, 30% Sn | 11.55 | >60,000 |
| 95% W, 5% nylon | 11.0 | >60,000 |
| 80% FeW, 19.75% Sn, 0.25% Kenolube | 11.0 | 28,982 |
| 29.8% W, 43.9% FeW, 26.1% Sn, 0.2% Kenolube | 11.2 | 18,831 |
| 40% W, 30% FeW, 10% WHA, 19.75% Sn, 0.25% Kenolube | 12.0 | 25,707 |
| 71.1% FeW, 28.7% Sn, 0.2% Kenolube | 10.8 | 19,648 |

It should be understood that the closer the extrusion constant for a particular composition is to the constant for lead or a particular lead alloy (such as a lead-antimony alloy) for which the composition is going to be used as a substitute, the more suitable the composition will be for reforming. From the illustrative examples shown in the preceding table, it can be seen that articles formed from compositions of matter 16 having extrusion constants of less than 30,000 psi may be desirable when the articles are to be reformed, and preferably less than 20,000 psi.

Lead reforms (or reflows or extrudes) at approximately 22–26 ksi (thousand pounds per square inch) for the reduction described above. Preferably, articles or other compacted structures formed from compositions of matter 16 according to the present disclosure will reform at pressures less than 50 ksi, and more preferably less than 40 ksi. It may be desirable for the articles and/or the compacted structures to have extrusion constants that deviate from the extrusion constant of lead (or a selected lead-antimony or other lead alloy) by no more than 20%, 10%, 5%, or even that are equal to or approximately equal to that of lead or a selected lead alloy. As a more particular example, an article extruded as described above and formed from 40% FeW (−100/+325 mesh), 15% W (25.4 micron), 23% WHA (−40 mesh), 21.8% Sn (ACUPOWDER $_{5325}$™) and 0.2% KENOLUBE had a density of 11.08 g/cc when compacted to 50 ksi and 11.64 g/cc when compacted to 100 ksi. When the article was reformed (or extruded) as described above, it did so at an applied pressure in the range of 40–50 ksi. Furthermore, the resulting extruded article had a shear strength of 40–50 pounds. As another example, an article extruded as described above and formed from 55% W (25.4 micron), 12.6% WHA (−40 mesh), 10.8% FeW (−100/+325 mesh), 21.4% Sn (ACUPOWDER 5325™), and 0.2% KENOLUBE had a density of 11.95 g/cc when compacted at 50 ksi and 12.61 g/cc when compacted at 100 ksi. The article also reformed at 40–45 ksi and had a shear strength of 55–75 pounds.

A benefit of an extrudable or reformable compacted structure is that the article can be initially compacted to an intermediate structure using a die assembly that is well-suited to withstand higher compaction pressures (such as a die with punches having faces that are free from knife edges, etc.). The intermediate structure can then be reshaped at the lower reforming pressure to the desired article shape.

Illustrative Powder Metallurgy Processes

A flowchart depicting illustrative steps for forming (near) net final shape articles 116 via powder metallurgy (i.e. from a composition of matter that is at least substantially, or even completely, in powder form) is shown at 120 in FIG. 14. At 122, the tungsten-containing powder and binder are mixed. The amount of tungsten-containing powder 12 and binder 14 is selected based in part on one or more of the desired density of the finished article, the force with which the composition will be compacted, the densities of powder 12 and binder 14, and the intended application and/or processing steps for the article. For example, when tungsten-containing powder 12 contains ferrotungsten powder and tungsten heavy alloy (WHA) powder that has a higher density than the ferrotungsten powder, less of the tungsten-containing powder will be required to obtain the same density as a corresponding article made without WHA powder.

As shown at step 124 of FIG. 14, the mixed powders (composition 16 ) are placed into a compacting die, such as a profile die, or other suitable mold or shape-defining device or devices that defines at least substantially the desired shape of the intermediate structure and which provides a base or frame against which the powder and binder may be compressed. The composition of matter is then compressed, as indicated graphically in FIG. 14 at 126. The step of compacting into the desired intermediate structure may utilize any suitable compressive rams, punches, presses, or other pressure-imparting devices or mechanisms. Alternatively, the powders may be mixed with a lubricant, extruded and then sintered.

As shown at 128 in FIG. 14, the compacted structure is then placed into a reshaping die, which may be the same or different from the compacting die. The reshaping die at least substantially defines the desired shape of the final article and provides a base or frame against which the intermediate structure may be reshaped. The intermediate structure is then reshaped into a second structure having a net final shape, or near net final shape, as indicated graphically in FIG. 14 at 130. Compressive rams, punches, presses, or other suitable pressure-imparting devices or mechanisms may be used to reshape the intermediate structure. Reshaping typically requires less pressure than initial shaping, and therefore, a wider range of tools may be used to reshape the intermediate structure.

In some embodiments, after reshaping step 130, article 116 has the desired net final shape for assembly into a finished article, as indicated at 132. In some embodiments, even though article 116 has the desired net final shape, it may still be desirable to process the article before a finished article is produced. In still other embodiments, it may be desirable (and is therefore within the scope of the present disclosure) to process an intermediate structure before reshaping or otherwise working the intermediate structure. Illustrative examples of these processing steps are shown in dashed lines in FIG. 14 and include binder activation 134, heating 136, sealing 138, coating or plating, 140, working 142 and jacketing 144. Working refers to machining, grinding, polishing, buffing, sanding, drilling, etc., such as indicated at 142 in FIG. 14. The working step may be performed prior to or after any of the other processing steps described herein.

It is within the scope of the present disclosure that a particular article may utilize as few as none of these additional processing steps and as many as all of these steps. Similarly, it is also within the scope of the present disclosure that processing steps may be utilized in addition to, or in place of, the illustrative steps described herein. In other words, steps 134–144 have proven effective in experiments and articles 10 produced according to the present disclosure will often utilize one or more of these steps. However, it is not a requirement that any or all of these steps be utilized, or that other processing steps not be utilized, to produce an article 10 according to the present disclosure.

As discussed in detail previously, when composition of matter 16 includes a binder 14, the binder will often need to be activated, or actuated, to provide the desired cross-linking, bonding, etc. This actuation step is indicated graphically at 134 in FIG. 14. At least in the context of pressure-actuated binders, the pressure applied to form intermediate structure 116 may be sufficient to actuate the binder. For other binders, the actuation step may include heating, water immersion, etc.

Heating/Warm Reforming

The step of reshaping the intermediate structure may be accomplished without heating the intermediate structure. Additionally or alternatively, the intermediate structure may be heated, including heating to the point of annealing and/or sintering, as indicated in FIG. 14 at 136 . Although graphically illustrated as occurring after the compression step, one or more types of heating of the intermediate structure and/or article may occur at one or more stages within the formation process, including before, during and/or after the compression step. It also should be understood that heating is not required in some embodiments, and that articles 116 may be produced according to the present disclosure without requiring the composition of matter to be heated. Typically, frangible articles are not sintered, but they may or may not be heated or annealed. Sintering may be either solid-phase sintering, in which the article is heated to near the melting point of the lowest melting component, or liquid-phase sintering, in which the article is heated to or above the melting point of the lowest melting component.

Some compositions of matter may be substantially more workable when adequately heated. In particular, those compositions of matter 16 that include an epoxy component have proven to be more easily reshaped when heated. In tests, heating compositions having an epoxy component has decreased the pressure required to effectively shape and reshape the compositions. Temperatures in the range of approximately 150°–450° F. may be used when warm reforming, with temperatures of approximately 325°–350° F. proving to be effective in many tested circumstances. Warm reforming at approximately 3,000–20,000 psi can achieve the same results as cold reforming at approximately 25,000–50,000 psi. At 325°–350° F. the epoxy component of composition of matter 16 is liquefied. After the composition of matter has been reshaped, it may be allowed to cool, which allows the epoxy component to harden. As described above, a hardened epoxy may improve the strength characteristics of a resulting structure.

The ability to reshape at lower pressures when using elevated temperatures is advantageous. For example, complicated articles can be reshaped from simple intermediate structures, such as right cylinders, which can be cold-compressed at relatively high pressures with relatively more robust tooling. Because the tooling for reshaping does not have to be as robust, it can be constructed from less expensive materials, such as tool steel or aluminum. The improved workability provided by warm reforming also provides the ability to form complicated shapes that may otherwise be impossible or commercially impracticable. Because reshaping may be effected at pressures even lower than those required for swaging lead alloys at room temperature, which is the standard practice for the ammunition industry, tools originally designed to work lead may be used to warm reform tungsten-containing intermediate structures.

During experiments, buckshot made from a composition including epoxy and having a 0.33 inch diameter has been flattened into a spheroid with a thickness of only approximately 0.28 inches using a pressure in the range of approximately 5,000–10,000 psi. Such a substantial amount of reshaping would take significantly more pressure if done cold. In another experiment, a composition including WHA, W, Sn, and 0.5% DUPONT™ 2-2709™ was initially cold compressed into a right cylinder at approximately 80,000 ksi. The right cylinder was then reshaped at approximately 325°–350° F. and approximately 5,000–15,000 psi. The top ¼ inch of the right cylinder was reshaped so that the finished article resembled the shape of a carriage bolt, with a shaft approximately 0.492 inches in diameter and 0.6 inches in length, and a head of approximately 0.525 inches in diameter and 0.200 inches in thickness. Such a shape would be difficult, if not impossible, to cold shape. With warm reforming, however, these and other previously difficult structures may be reshaped with relatively inexpensive tooling.

Additional Processing (Seal, Coat, Jacket, Etc.)

When producing article 10, it may be beneficial to apply a surface and/or subsurface sealant or protective layer to the compacted and/or reshaped article, such as to improve the article's strength. Sealing, coating/plating and jacketing all tend to increase the overall strength of a compacted structure. However, as described in more detail below, sealing increases the internal strength of the structure because the sealant is purposefully forced into the subsurface region of the compacted structure. On the other hand, coating, plating, and jacketing tend to increase the external strength of the compacted structure by providing an external cover around the structure.

Sealing

As indicated at 138 in FIG. 14, the intermediate structure and/or (near) net final shape article may be sealed. To provide a graphical illustration of a sealing process, FIG. 15 provides a schematic view of a portion of a compacted intermediate structure 170, which may be further processed to form a firearms projectile or other article according to the present disclosure. The sealing process described herein may additionally or alternatively be applied to compacted (near) net final shaped articles. FIG. 15 schematically shows that the intermediate structure includes pores 172, the size of which have been exaggerated to better illustrate the sealing process. Sealing step 138 refers to purposefully introducing sealant beneath the exterior surface of the compacted structure/article to be sealed, such as into the pores that are present at the exterior surface.

Illustrative (non-exclusive) examples of a suitable sealant include thermoset and thermoplastic resins, rigid epoxies, acrylics, methacrylates, and the like. As another example, RESINOL®, a low viscosity liquid polymer sealant formulated for water wash removal, has proven effective. Such a sealant is designed to cure anaerobically at room temperature, meaning it cures when deprived of oxygen/air. Such a sealant may also be described as being adapted to be cured by exposing the sealant to an anaerobic, or oxygen-deprived, environment. It is within the scope of the disclosure to use other sealants, and the above is provided as a non-limiting example. For example, other suitable polymeric sealants are cured or cross-linked through the application of water or heat. Examples of heat-curable sealants include thermoset and thermoplastic resins or polymers, such as LOC-TITE® epoxies. Still other non-metal sealants, such as sodium silicate, solidify from a liquid state through crystallization. Still another example of a suitable sealant is a metal sealant, which is introduced, or infiltrated, into the compacted structure in a liquid or molten state, and thereafter allowed to solidify.

A sealant may be introduced via any suitable process. Preferably, the sealing step involves urging the sealant into the pores, as opposed to merely contacting the compacted structure with a sealant, which may or may not extend somewhat into the pores. Instead, the sealing process preferably applies sufficient forces to the compacted structure to draw, force or otherwise urge the sealant into the pores. An example of a suitable process is a vacuum impregnation process. Vacuum impregnation typically includes evacuating air from the internal porosity of the intermediate structure, as is schematically illustrated by arrows 174. FIG. 16 schematically shows the introduction of a sealant 176 to the pores, which typically is accomplished by immersing one or more intermediate structures (or other compacted structures)

in the liquid sealant. The evacuation of the pores creates a pressure differential that encourages the sealant to flow into the pores, as is indicated by arrows 178. A capillary effect or the application of positive pressure may further encourage flow of the sealant into the pores. As the infiltration of the sealant corresponds to a removal of air from the pores, the bulk density of the structure being sealed is increased. Furthermore, and as discussed, the sealant increases the overall strength of the structure. Because the sealant is purposefully infiltrated into the structure, it adds strength to the structure at a subsurface level. Typically, sealing will only introduce the sealant into a subsurface region of the compacted structure, leaving a central interior portion of the compacted structure free from sealant. The depth of the subsurface region may vary within the scope of the present disclosure, but typically does not extend completely through the compacted structure.

After the pores have been impregnated with sealant, the sealant is then solidified or otherwise hardened or cured. For example, in the case of a polymer sealant, the sealant is polymerized or cross-linked to form a solid polymer. In some embodiments, a catalyst bath may be used to facilitate setting the polymer. Other polymers may be cured by heating, applying pressure, applying hydration, exposing the sealant to an aerobic environment, exposing the sealant to an anaerobic environment, etc. Although the sealant internally seals the pores of the intermediate structure, the structure typically remains at least substantially unchanged cosmetically and dimensionally. As shown in FIG. 16, the sealant may also be present in a film, or other surface layer, 180, on the structure being sealed. Film 180 may be retained to provide a surface coating, but it is often removed via any suitable process. For example, the residual coating of a water-soluble polymeric or other sealant may be removed by rinsing the structure with water. Similarly, a residual surface coating of other sealants may be removed by mechanical abrasion or with other suitable solvents, such as depending upon the particular sealant being used. The sealant that infiltrated into the pores of the structure will remain after film 180 is rinsed away, as shown in FIG. 17. Thus, the ability of the intermediate structure to resist breaking apart during further processing is preserved even if the surface coating of the sealant is removed. When a polymeric sealant is used and the sealed structure is to be plated, the surface coating of sealant will typically be removed prior to plating the structure.

Vacuum impregnation may not be appropriate for some sealants, and other sealing techniques may be implemented when appropriate. Similarly, other curing or solidification techniques may be used. For example, heat curing or water curing may be desirable when using certain sealants and/or compositions 16.

In the graphical examples shown in FIGS. 15–17, the sealing process is illustrated with respect to an intermediate structure 170 that includes a projecting portion 182. Such a portion may be a byproduct of the initial compaction process, for example. Further processing of the intermediate structure may include removing or reshaping the portion from the sealed intermediate or (near) net final shape structures, or other similar physical changes. For example, any suitable grinding or other working process may be used to at least partially, and preferably completely, remove the portion or other undesirable portion of the intermediate structure. Similarly, the above discussed reforming process may be used to alter the shape of the projecting portion, urge the projecting portion into the body of the intermediate structure, etc. When the structure has been sealed prior to this grinding or other reshaping or material-removing step, the sealed structure is much stronger and able to withstand the forces imparted thereto during this process. For example, many unsealed intermediate structures formed from compositions of matter 16 may fracture or otherwise break into pieces when ground or otherwise worked to remove the band. However, the internal, or subsurface, strength provided by the sealing step enables the intermediate structures to be ground and retain structural integrity.

In FIG. 18, the illustrative intermediate structure 170 from FIG. 17 is shown with portion 182 removed. As shown, removal of the portion exposes a region, or surface, 184 of the structure that was not previously exposed to the sealant, and as schematically illustrated in exaggerated size, this region may include pores 186 that were not sealed during the first sealing step because of the presence of the portion. Although a grinding process, when used, preferably only removes portion 182 or any other undesirable portion of the intermediate or other compacted structure, some grinding processes may not be adapted for precise removal of only these portions and may therefore remove some material from other regions of the structure. Accordingly, additional unsealed surfaces and/or pores may be exposed during some implementations of the grinding step. Similarly, reshaping the intermediate structure may also expose pores or other voids that may be filled by thereafter (re)sealing the structure. This is schematically illustrated in dashed lines in FIG. 18 at 184' and 186'.

It is within the scope of the disclosure to proceed directly to a plating and/or assembly step after the compaction, sealing and/or grinding steps are completed. However, it is also within the scope of the disclosure to reseal the intermediate or other compacted structure after the grinding step. For example, in FIG. 19, the intermediate structure 170 from FIG. 18 is shown after being resealed. As shown, pores previously exposed during grinding have been sealed, thus increasing the strength of the structure. This second sealing process may be identical to the previously described sealing process. However, it is also within the scope of the disclosure that a different sealing process may be used, such as to use a different sealant, a different mechanism or different conditions for applying or infiltrating the sealant, etc.

Coating/Plating

As indicated in FIG. 14 at 140, intermediate and (near) net final shape articles according to various embodiments of the present disclosure may be plated or otherwise coated, such as to protect the article during handling, processing and/or assembly, to provide an exterior layer having a different composition and/or different properties than the compacted structure, to provide a layer that protects or otherwise provides a boundary between the article and external objects, etc. Examples of suitable coating materials include metal, plastics, polymers, etc. The term "plating" is often used in connection with metallic coating materials, with the term "coating" being used herein to more generally refer to the application of a surface layer to the intermediate, compacted, (near) net final shape or other structure formed from composition of matter 16.

To provide a non-limiting graphical example, FIG. 20 shows an article in the form of a core 190 for a bullet 192 made with composition of matter according to the present disclosure, which as discussed may be a non-toxic lead substitute 194. Core 190 has been coated with a layer of coating material 196.

FIG. 21 shows that bullet 192 may also be jacketed with a jacket 198. It should be understood that bullet 192 is provided as one example of the many possible articles that may be coated according to the present disclosure. Furthermore, it should be understood that coating may be performed in addition to sealing or in the absence of sealing. Therefore, articles according to the present disclosure may be any combination of sealed, coated, and jacketed.

Coating typically includes exposing bullet core 190, or any other article made according to the present disclosure, to a liquid, molten or other non-solid coating material and allowing the molten material to solidify on the core as coating (or plating) layer 196. For example, the coating material may be introduced to the core by submerging the core in a volume of the molten or otherwise liquid coating material, spraying the material onto the core, electroplating the core, applying the coating material through chemical or physical vapor deposition, or other suitable methods. In other words, coating is not intended to refer to mechanically forming a solid sheet of coating or plating material around the core. Examples of plating materials include copper, tin, zinc, nickel, alloys thereof, including alloys of any of these metals and other materials. In some applications, it may be desirable to utilize non-toxic coating materials. The thickness of the coating layer may be selected according to its intended purpose. For example, a relatively thin coating layer, such as a layer having a thickness of 0.003 inches or a thickness of less than 0.005 inches, may be applied to increase the strength of the bullet and to provide a protective layer thereto. However, it is also within the scope of the disclosure to apply thicker coating layers. For example, some firearm barrels include rifling that extends into the barrels and imparts spin to a bullet when the bullet is propelled through the barrel. When core 190 is intended for use in such a barrel, the coating layer may be applied to have a thickness that exceeds the height of the rifling so that the coating layer (and not the core) interacts with the rifling. Rifling typically is approximately 0.005 inches in height, so a coating layer 196 in the range of approximately 0.005–0.008 inches or more in thickness has proven effective. In such an application, the coating layer itself forms what otherwise may be referred to as a jacket around the core. It should be understood that the above are only examples of the many coating methods and arrangements that are within the scope of the disclosure, and should not be considered as limiting. Other coating materials, methods of coating, and coating thicknesses may be used.

Jacketing

As indicated at 144 in FIG. 14, intermediate, (near) net final shape and other articles produced from compositions of matter 16 according to present disclosure may be jacketed. Jacketing is often utilized for firearms projectiles, such as bullets, but it may be used for other articles without departing from the scope of the disclosure. In FIG. 21, a bullet 192 is shown including a jacket 198 . In such an embodiment, bullet 192 may be referred to as a jacketed bullet, and jacket 198 may be described as at least substantially, if not completely, enclosing a core 190 formed at least substantially from composition of matter 16. Because lo bullets are commonly expelled from firearms at rotational speeds greater than 10,000 rpm, the bullets encounter significant forces. When the bullet is formed from powders, there is a tendency for these rotational forces to remove portions of the bullet during firing and flight. Jacket 198 may be used to prevent these forces from fragmenting, obturating (deforming on account of fragmenting), and/or dispersing the core during flight.

Jacket 198 may partially or completely enclose the bullet core. For example, it is within the scope of the disclosure that jacket 198 may completely enclose the bullet core. Alternatively, the jacket may only partially enclose the core, thereby leaving a portion of the core not covered by the jacket. For example, the tip of the bullet may be unjacketed.

Jacket 198 may have a variety of thicknesses. When used to at least substantially, or even completely, enclose a firearms projectile formed from composition of matter 16, jacket 198 typically will have an average thickness of approximately 0.025 inches or less, including an average thickness of approximately 0.01 inches or less. Accordingly, it should be understood that the depicted thickness of the jacket and relative thickness of the jacket compared to the overall shape and size of the bullet is not drawn to scale.

An example of a suitable material for jacket 198 is copper, although other materials may be used. For example, jacket 198 may be additionally or alternatively formed from one or more other metallic materials, such as alloys of copper like brass, a ferrous metal alloy, or aluminum. As another example, jacket 198 may be formed from an alloy of copper and zinc (such as approximately 5% zinc) when the projectiles are designed to be higher velocity projectiles, such as projectiles that are designed to travel at speeds of at least 2,000, 2,500 or more feet per second. Jacket 198 may also be formed from a non-metal material, such as a polymer or a plastic. An example of such a material is nylon. When jacket 198 is formed from metallic materials, the bullet may be formed by compressing the powder and the binder in the jacket. Alternatively, the bullet core may be formed and thereafter placed within a jacket. As another example, the bullet core may be formed and then the jacket may be applied over the core by electroplating, vapor deposition, spray coating or other suitable application methods. For non-metallic jackets, dip coating, spray coating and similar application methods have proved effective.

When designed for use with rifled barrels, a jacketed bullet according to the present disclosure preferably has a jacket thickness that exceeds the height of the rifling. Otherwise, it may be possible for the rifling to cut through the jacket and thereby expose the bullet core. This, in turn, may affect the flight and performance of the bullet, as well as increase fouling of the barrel. A jacket thickness that is at least 0.001 inches, and preferably at least 0.002 to 0.004 inches thicker than the height of the rifling lands has proven effective. For most applications, a jacket 198 that is at least 0.005 inches thick should be sufficient. In firearms, such as shotguns, that have barrels with smooth (non-rifled) internal bores, a thinner jacket may be used, such as a jacket that is 0.001–0.002 inches thick. However, it should be understood that it is not required in these applications for the jacket to be thinner and that thicker jackets may be used as well.

Figure 22:
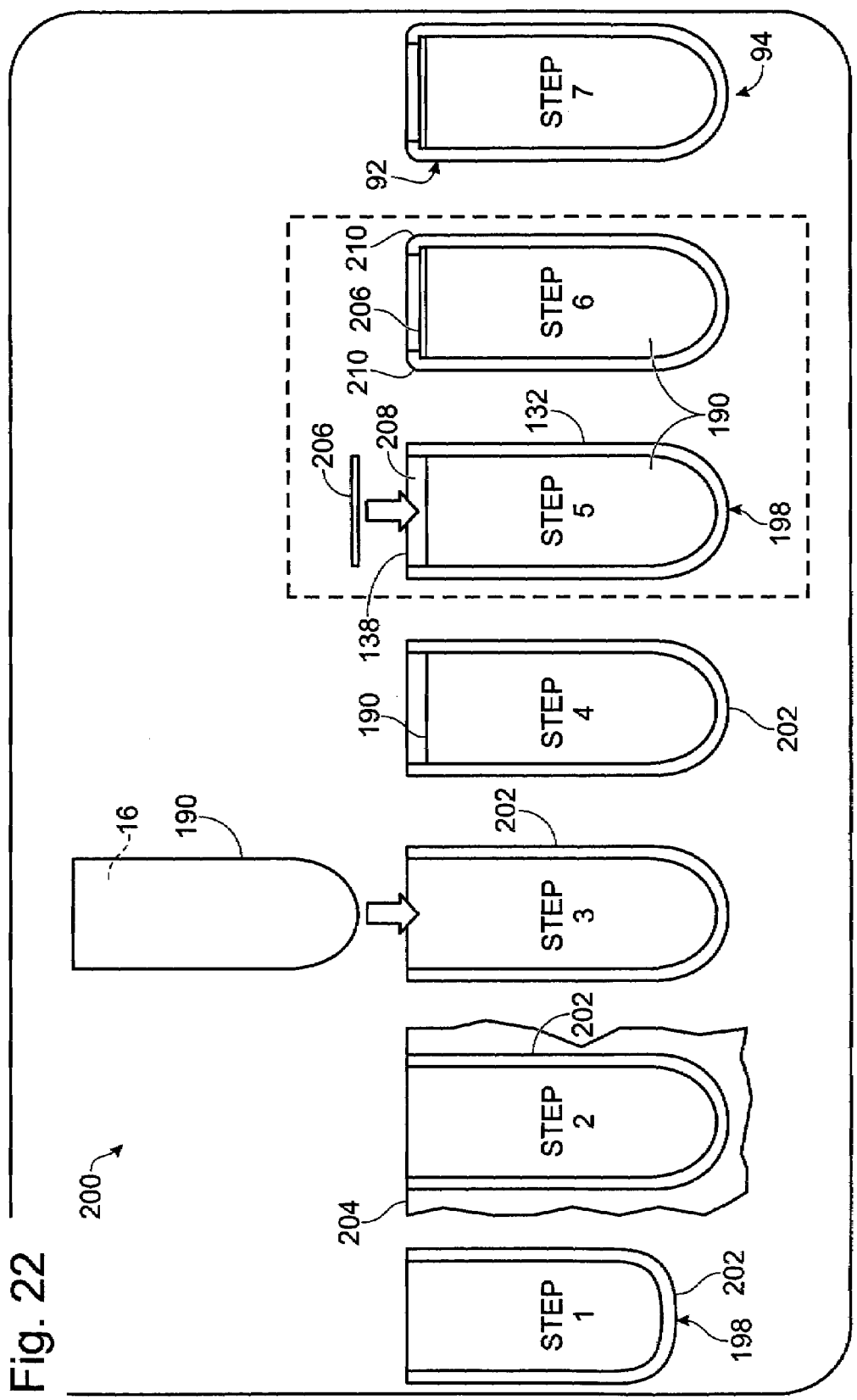
FIG. 22 is a diagram illustrating an example of a method for forming a jacketed bullet according to the present disclosure.

When a jacketed article is to be formed, it is possible to place a composition of matter 16 into the jacket (such as jacket 198 ) prior to compressing or otherwise compacting the composition of matter. For example, powder 12 and binder 14 may be mixed and then added to the jacket, which may subsequently be placed into a die. Alternatively, the jacket may be placed into a die or other suitable mold, and then the composition of matter may be added. In FIG. 22, an illustrative example of a method for forming an article 10 in the form of a jacketed bullet is shown and generally indicated at 200. In the illustrated example, jacket 198 starts as a body 202 of a pinch-trimmed jacket that is placed into a die 204 and subsequently shaped to a point-form jacket. A core 190 formed at least substantially from composition of matter 16 is inserted into body 202. Alternatively, an uncompacted composition of matter 16 is added to the jacket, and then subsequently compressed, and in some embodiments heated and/or actuated. The jacket is then sealed. A retainer disk 206 is placed over the opening 208 of jacket body 202, and then the ends 210 of the point-formed jacket are crimped around the disk to enclose core 190. It should be understood that FIG. 22 is provided as an illustration of one suitable method, but other suitable methods may be used.

It is also within the scope of the present disclosure that any one or more of the actuation, compressing, heating, sealing, coating, plating, working and jacketing steps described herein may be performed to the intermediate structure, either in addition to or instead of one or more of these steps being performed to the near (net) final shape article. As an illustrative, non-exclusive example, an intermediate structure 16, such as may be used as a firearms projectile, may be sealed, coated/plated, worked and/or jacketed prior to undergoing the reforming (reshaping) process described herein. After reforming, any or all of these steps may be repeated. However, it is also within the scope of the disclosure that these steps be performed only once (such as to either of the intermediate or (near) net final shape structures), or not at all.

Powder Processing

In FIG. 14, the illustrative flow chart began with mixing step 122. It is certainly within the scope of the present disclosure that the components of composition of matter 16 may be provided in suitable powder form. However, for at least applications in which composition of matter 16 is utilized in a powder form, it is within the scope of the present disclosure that step 122 may be preceded and/or replaced by a preparation step, in which the components of composition of matter 16 are prepared into a suitable powder form. For example, one or more of the components may need to be milled or otherwise ground into powder. Similarly, the produced, or otherwise available, powder may undergo at least one separation step in which the powder is sieved or otherwise separated to remove particulate that is larger and/or smaller than a desired particle size or range of sizes. This preparation of powder may be accomplished in a single step, or in more than one step. Similarly, it may be accomplished in any suitable type of process, including batch and continuous flow processes. Similarly, the illustrative preparation steps may be performed to the entire composition of matter, to only selected components thereof and/or separately to selected components thereof.

Articles

Article 10 may itself form a finished article, meaning that the article is ready for use or sale without additional processing of the article itself. Alternatively, article 10 may be described as forming a component or region of a finished article and/or receive an additional processing step before being a finished article or finished component.

For example, article 10 may itself form a firearms projectile according to the present disclosure. Examples of such projectiles include bullets, shot, with examples of shot including shot slugs and shot pellets. As used herein, the term "shot" refers to projectiles that are fired from a conventional shotgun or similar firearm and which are typically fired from a shot cartridge that includes a metallic base and a non-metal hull, or shell, within which a single shot slug or a plurality of shot pellets are housed. Shot shells and shot cartridges typically exhibit comparably lower pressures when fired than bullet cartridges. These projectiles may also be described as components of other articles, namely, shot shells (which may also be referred to as shotgun cartridges) and other firearms cartridges, such as bullet cartridges. As another example, bullet projectiles may be inserted into sabots, and thereafter utilized as black powder bullets, or thereafter assembled into a bullet cartridge. As a further alternative and example, article 10 may form a core for a bullet or shot, and this core may be jacketed or otherwise coated or encased in a covering material and/or sealed on a subsurface level prior to forming one type of finished article, and the jacketed/coated/sealed core may thereafter also be incorporated into a shot shell or firearms cartridge to form another type of finished article.

As another example, article 10 may form a finished article in the form of a golf club weight or a dart weight according to the present disclosure, either in its original form or after being coated or otherwise jacketed or encased in a protective coating or shell. Similarly, the weight may be incorporated into another type of finished article, namely a golf club or a dart. As another example, a radiation shield or a weight, such as a fishing weight, wheel weight, aircraft stabilizer, counterbalance, etc., may be entirely formed from composition of matter 16 or may have a coated or jacketed core that is formed from the composition of matter. Furthermore, the weight/core may include mounts, such as to join a fishing weight to a fishing line, leader, swivel or the like and/or may be a component that is inserted into or otherwise forms a portion of the finished weight, to secure a dart weight to a dart body, or otherwise to secure the weight to other structures. As still another example, an article may have a body that is formed from composition 16 but which also includes ribs or other partitions or supports that extend through the body and which are formed from other materials.

Article 10 may take a variety of forms, including being used to form articles that conventionally have been produced from lead or lead alloys. For example, many lead weights are formed from essentially pure lead, which has a density of 11.3 g/cc. As another example, some firearms projectiles, such as 0.22 bullets may be formed from pure lead, but most are formed from an alloy of lead and a comparatively small weight percentage of antimony. Illustrative densities of these lead-antimony alloys include 11.2 g/cc (lead with 1–2 wt % antimony), 11.1 g/cc (lead with 3–4 wt % antimony), or 10.9 g/cc (lead with 6 wt % antimony). However, unlike lead or lead alloys, article 10 is preferably formed from non-toxic (at least in the concentration and composition present in article 10), environmentally safe components.

Articles 10 constructed according to the present disclosure are preferably lead-free. For example, lead-free articles may be desirable in any application where the lead-based articles pose contamination risks, such as for ground or water contamination. Examples of these situations include water-related activities such as bird hunting and fishing, and land-based activities such as other hunting or target shooting applications where the discharged (fired) projectiles may remain in the environment. These applications include outdoor applications, such as outdoor shooting ranges and sport hunting applications, as well as indoor applications, such as indoor practice or target-shooting ranges. Although in some embodiments, articles 10 and/or composition of matter 16 are lead free, it is also within the scope of the disclosure to produce articles or compositions of matter that include some lead so long as the lead component does not raise the toxicity of the article or composition of matter beyond an acceptable level, such as may be established by state, federal, or other regulatory or advisory agencies.

Figure 23:
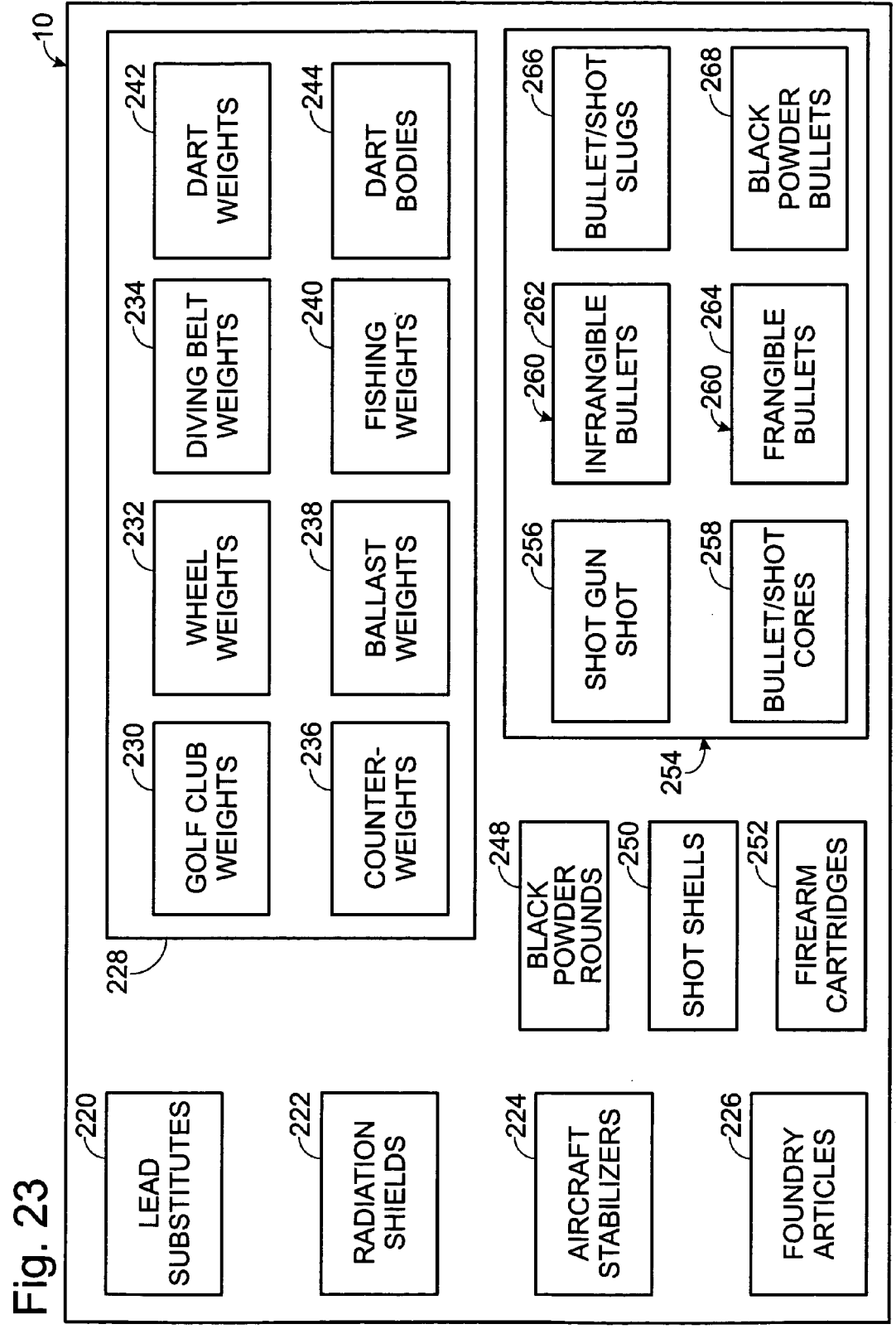
FIG. 23 is a schematic diagram showing illustrative examples of articles that may be formed from compacted intermediate structures according to the present disclosure.

As schematically shown in FIG. 23, illustrative examples of articles 10 that may be formed from compositions of matter 16 (and optionally any of the methods described herein) include lead substitutes 220, radiation shields 222, aircraft stabilizers 224, foundry articles 226, and weights 228, including golf weights 230, wheel weights 232, diving belt weights 234, counter-weights 236, ballast weights 238, fishing weights 240, dart weights 242 and dart bodies 244.

Another type/application of article 10 that may be produced from composition of matter 16, such as according to any of the methods of the present disclosure, is a marker for medical imaging. A non-exclusive example of such an application is mammography, but it may be applied to other procedures in which X-rays or other radiation is used to create medical images, such as on films or other detectors, wherein articles 10 may be used to define reference positions or other markers or reference sizes on the film or other images. In such an application, article 10 should have sufficient density to block the X-rays (or other radiation) that is used in the imaging process. For example an article 10 may be placed on a patient or other object to be exposed to X-rays or other radiation to provide a marker, or reference position, in the X-ray (or other exposed film or produced image). In such an application, it may be desirable to produce objects 10 to have predetermined sizes and/or shapes. In experiments, spheres in the range of 1.5–5 millimeters have been effective markers. In some applications, it may be desirable for articles 10 to additionally or alternatively have shapes with defined visual (non-symmetric) orientations. The objects may further include adhesive surfaces or other fasteners to secure the markers in a selected position, such as on a patient's body.

As described in more detail herein, composition of matter 16 (and optionally any of the methods described herein) may also be used to form firearms projectiles 254, including shotgun shot 256, bullet/shot cores 258, and bullets 260, such as infrangible bullets 262, frangible bullets 264, bullet/shot slugs 266, and black powder bullets 268. Similarly, these projectiles may be assembled into such ready-to-fire articles as black powder rounds 248, shot shells 250, firearms cartridges 252, as well as other structures used to house a firearms projectile. Various ones of these articles are described in more detail herein, along with illustrative (non-exclusive) methods that may be used to process and/or form the articles. Illustrative ones of these articles are discussed in more detail and shown in FIGS. 24–48.

FIG. 24 shows an article 10 in the form of a golf club 292 constructed with golf club weight 230 that is formed from composition of matter 16, such as from any of the illustrative processes described and/or incorporated herein. Club 292 includes an elongate shaft 294, which typically includes a grip 296, and a head 298 with a face that is adapted to strike a golf ball. The shape and configuration of club 292 may vary, such as from a putter, to an iron, to a driver or other wood. Golf club weight 230 may be sized and positioned to produce a golf club with a desired swing characteristic.

Illustrative examples of shot 256 according to the present disclosure are schematically illustrated in FIGS. 25 and 26. Although illustrated as having spherical configurations, it is within the scope of the disclosure that shot 256 may have non-spherical configurations as well. Shot 256 may also be referred to as shot pellets. In solid lines in FIG. 25, shot 256 is shown being completely formed from a composition of matter 16. Shot 256 may include a component that is formed from a material other than the composition of matter discussed herein. For example, and as indicated in fragmentary dashed lines in FIG. 25, shot 256 may include a core 272 that is at least substantially or completely formed from a composition of matter 16 according to the present disclosure and further includes an exterior layer 274, such as a coating 276 and/or a jacket 278.

Shot 256 may be formed from any suitable processes, including being cast or quenched from a molten feedstock and being formed via powder metallurgy. When formed by powder metallurgy, the shot pellet may be derived from an intermediate structure that includes a projecting ring, or central band, 280, which is illustrated in dashed lines in FIG. 26. When such a band is present in an intermediate structure from which the shot pellet is formed, such as via powder metallurgy using one of the methods described herein, the band preferably is at least substantially, and often completely removed during construction of the finished shot pellet. The intermediate structure shown in FIG. 26 may be described as having generally opposed convex, or hemispherical, portions 282 that are separated by a generally cylindrical portion 284. The diameter of the cylindrical portion may coincide with the diameter of the sphere that would otherwise be defined by the convex portions, but it is also within the scope of the disclosure that the diameter of the cylinder is larger than the diameter of the sphere, such as indicated at 280' in FIG. 26.

Figure 27:
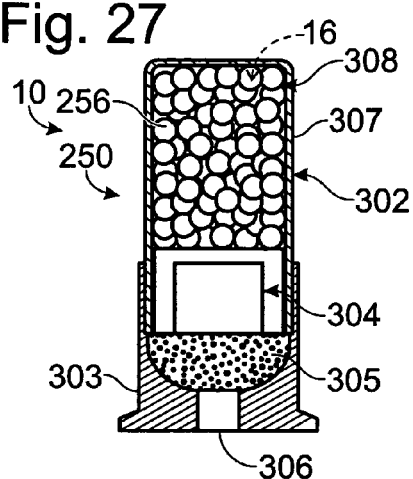
FIG. 27 is a schematic cross-sectional view of a shotgun shell, or cartridge, containing shot according to the present disclosure.

In FIG. 27, an example of a shotgun shell 250 constructed with shot 256 is shown. Shell 250 may also be referred to as a shot cartridge, or a shotgun cartridge. As shown, shell 250 is ready to be loaded into a firearm, such as a shotgun, and upon firing, discharge shot 256 at high speeds. Shot shell 250 may be configured for compatibility with a variety of firearms. In particular, the cartridge may be sized for proper loading into different caliber firearms. Examples of conventional shotgun sizes, with reference to the diameter of the barrel of the shotgun, include 8, 10, 12, 16, 20, and 28 gauge shotguns, as well as a 0.410 shotgun, which refers to a barrel with a diameter of 0.41 inches.

As shown in FIG. 27, shell 250 includes a case or casing 302. Casing 302 includes a base 303, which is typically formed from metal and houses the shell's wad 304, charge 305 and primer, or priming mixture, 306. The case also includes a hull, or shot region, 307, which is typically formed from plastic or another suitable non-metallic component and which defines a chamber 308 into which at least one shot 256 is housed. The top of the hull is typically crimped closed, although other constructions and sealing methods may be used. As discussed, most conventional shotgun shells are designed to house a plurality of shot, such as shown in FIG. 27. It is within the scope of the disclosure that shell 250 may include other constituent elements, as are conventional or otherwise known in the field of shotgun cartridge construction.

In FIG. 27, a plurality of shot 256 are included within shell 250, and the shot may be individually sized and shaped. Typically, each of the shot will have at least substantially the same size and shape as the other shot used in the same shell. However, it is also within the scope of the disclosure that shell 250 may include shot 256 having two or more distinct sizes, densities, materials of construction, formation methods, etc. The precise size of the shot pellets may be selected according to the desired use of the shot. For example, if designed for use as buckshot, each shot 256 will typically have a diameter D of approximately 0.24 to 0.36 inches. When designed for use as birdshot, each shot 256 will typically have a diameter of approximately 0.08–0.2 inches.

For purposes of providing further examples, the following table provides examples of conventional shot sizes and the corresponding diameters.

TABLE 4

Illustrative Shot Sizes and Diameters

| Buckshot | | Birdshot | |
| --- | --- | --- | --- |
| size | diameter (inches) | size | diameter (inches) |
| No. 4 | 0.24 | No. 9 | 0.08 |
| No. 3 | 0.25 | No. 8 | 0.09 |
| No. 1 | 0.30 | No. 7.5 | 0.095 |
| No. 0 | 0.32 | No. 7 | 0.1 |
| No. 00 | 0.33 | No. 6 | 0.11 |
| No. 000 | 0.36 | No. 5 | 0.12 |
| | | No. 4 | 0.13 |
| | | No. 3 | 0.14 |
| | | No. 2 | 0.15 |
| | | No. 1 | 0.16 |
| | | No. B | 0.17 |
| | | No. BB | 0.18 |
| | | No. BBB | 0.19 |
| | | No. T | 0.20 |

The number of individual shot in a particular shotgun shell 250 will tend to vary at least partially upon the diameter of the individual shot. For example, a double aught buckshot shell will typically include nine shot, while most birdshot shells will include dozens, if not hundreds, of shot. Although shot 256 having any of the above-identified diameters are within the scope of the present disclosure, the powder metallurgy processes described herein will most likely be used for larger shot, such as shot having a diameter of at least 0.1–0.13 inches. As discussed, shot 256 having dimensions other than illustrated herein also may be produced. Similarly, it is also within the scope of the present disclosure that a shot shell 250 may include some shot that is produced from composition of matter 16 and/or methods according to the present disclosure, while other shot within the shell may be formed from other materials and/or via other processes.

Figure 28:
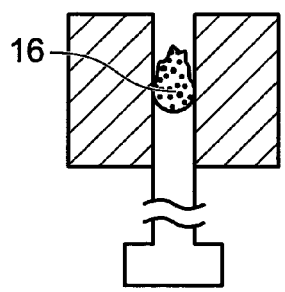
FIGS. 28–30 are schematic representations of a powder metallurgy process for forming shot according to the present disclosure.
Figure 29:
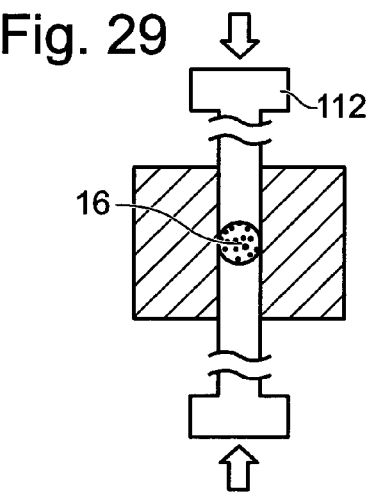
Figure 30:
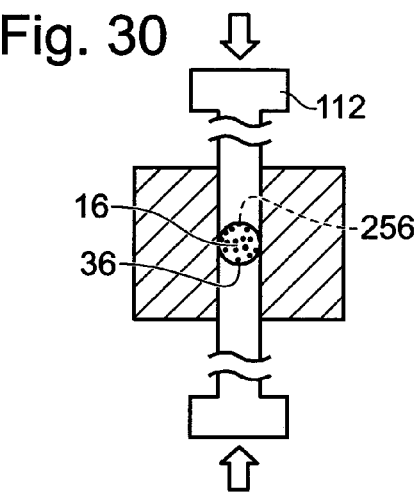

FIGS. 28–30 somewhat schematically depict a process in which a powder-form composition of matter 16 is compacted to form shot 256 or a compacted intermediate structure 36 from which shot 256 is formed. As discussed, the intermediate structure may be sealed, worked, heated, reshaped, coated, plated and/or jacketed without departing from the scope of the present disclosure. Similarly, and as also discussed elsewhere herein, shot 256 produced according to the present disclosure may be selectively frangible or infrangible.

As discussed, although most shot shells include a plurality of shot, or shot pellets, such as shot 256, some shot shells are designed to fire only a single projectile. These projectiles are often referred to as shot slugs, and the corresponding shells may be referred to as slug shells. Furthermore, whereas individual shot pellets are typically dimensioned with a significantly smaller diameter than the inner diameter of the barrel from which they are fired, a slug may be dimensioned to more closely correspond to the barrel so that the barrel may ballistically control the slug. In other words, the slugs tend to be larger in diameter than pellets, thereby limiting lateral movement within a barrel when the slug is fired. In some embodiments, the slugs may be configured to engage rifling of the barrel when fired (when fired from a firearm with a rifled barrel), thereby increasing the ballistic control of the slug.

A barrel may impart ballistic control to a slug that has been sized to closely correspond to the inner diameter of the barrel, or a barrel may ballistically control a slug that has been sized so that a slug cup or sabot surrounding the slug closely corresponds to the inner diameter of the barrel. Shot slugs (or shot slugs with corresponding shot cups or sabots) typically have a diameter that is at least 80% of the diameter of the barrel from which the slug is fired, with diameters of at least 90%, or even 95% to almost 100%, being more common. Shot slugs and their corresponding cartridges may be configured to be fired from shotguns that can also fire conventional shotgun shot or pellets. In further contrast to conventional shot and shot pellets, shot slugs have a defined orientation relative to the long axis of the barrel of the firearm from which they are fired. More specifically, shot slugs have defined forward and rearward ends. Therefore, while slugs may rotate about their longitudinal axes, the relative positions of these ends are not reversible as the slug travels within the firearm barrel. Shot slugs are also distinguishable from bullets, which are fired from pistols or rifles and which are at least partially surrounded by metal casings in the cartridge on account of the higher pressure and velocity that are typically encountered when the bullet cartridges are fired by these types of firearms.

Illustrative examples of shot slugs 266 according to the present disclosure from compositions of matter 16 are shown in FIGS. 31–36 and indicated generally at 310. Slugs 310 may be referred to as Foster-type slugs. More particular illustrative embodiments are shown in FIGS. 31–34 at 311, in FIG. 35 at 330, and in FIG. 36 at 350. In the following discussion, references to slug 310 refer generally to any firearm slug according to the present disclosure and therefore include, but are not limited to, the illustrative embodiments depicted as slugs 310, 330 and 350. Furthermore, the illustrative embodiments (311, 330 and 350) are provided to illustrate exemplary configurations, with the elements, subelements, variations, and alternatives discussed herein being applicable, but not required, to any of the illustrative embodiments or other slugs described, incorporated and/or illustrated herein. Similarly, and for the purpose of brevity, similar elements of the various illustrative embodiments, including variations thereto, will not be represented and discussed with each illustrative example depicted herein but remain within the scope of the present disclosure.

As shown in FIGS. 31 and 32 with reference to slug 311, firearm slugs 310 according to the present disclosure include a body 314 having a nose, or forward region, 316 and a base, or rearward region, 317. As used herein, the forward region refers to the portion of the slug that is designed to first leave the barrel of a firearm from which the slug is fired. Similarly, the base, or rearward region refers to the portion of the slug that is oriented toward the primer and propellant in a firearms cartridge and thereby is the last portion of the slug to leave the firearm barrel. In the illustrated embodiment, the nose or forward region of the slug has a tapered, generally convex configuration, and the base or rearward region defines a flat, or generally planar, region.

As perhaps best seen in FIG. 32, slug 311 also includes a front internal recess 318 formed in forward region 316 and a rear internal recess 320 formed in rearward region 317. It is within the scope of the disclosure, however, that slugs 310 according to the present disclosure may include only one of recesses 318 and 320, such as only a front internal recess, or more typically, only a rear internal recess. It is also within the scope of the disclosure that a slug may be formed without a front or rear recess, and in some embodiments, the slug may be shaped with other physical features.

The front and rear internal recesses, when present, may be variously dimensioned. A particular size and shape of a particular recess may be chosen to impart the slug with desired characteristics. For example, a relatively large rear internal recess 320, such as shown in FIGS. 31 and 32 with respect to slug 311, decreases the mass near the rear of the slug compared to a slug of comparable size and composition, thus increasing the relative proportion of mass near the front of the slug. A forward-weighted slug may facilitate a truer flight, thus increasing the accuracy of the projectile. A relatively large rear internal recess also increases the proportion of mass near the perimeter of the slug, thereby increasing the moment of inertia of the slug about the slug's longitudinal axis A. A slug with a relatively high moment of inertia is better suited to resist angular acceleration. In the illustrative example shown in FIGS. 31 and 32, rear recess 320 extends more than halfway between the nose and base of the slug. It is within the scope of the disclosure that the rear recess, when present, may extend to different depths, or extents, within the slug, including greater and lesser depths than shown in the illustrative example. For example, rear recess 320 may extend at least approximately 20% of the distance between the nose and base of the slug, such as within ranges of 20%–75% of the distance or 25%–50% of the distance. Expressed in other words, the rear recess 320 may extend into body 314 from base 317 at least one of the above percentages or ranges of percentages of the length of the slug, which is measured between the slug's nose and base, as indicated at L in FIG. 31.

As perhaps best seen in FIG. 32, body 314 of the slug includes a skirt 322, which extends radially outward from the longitudinal axis A of the slug from rear recess 320 to the outer perimeter 321 of the slug's body. The thickness of skirt 322, which defines, at least in part, the sidewalls 324 of rear recess 320, may be sized to increase the effectiveness of the slug. In particular, the skirt is typically designed thick enough to allow the slug to remain intact when fired. The skirt also may be tapered to help improve the structural stability of the slug. An initial skirt thickness (at base 317) of approximately 1/16 inch has been found to be effective, although a lesser or greater thickness may be used within the scope of the disclosure. For example, the skirt may be sized with an initial thickness in the range of approximately 1/32 inch to approximately 1/4 inch or more. It should be understood that there is a relationship between the thickness of the skirt and the width of the recess, with thicker skirts corresponding to narrower recesses for the same diameter of slug.

A front recess, such as indicated at 318 in FIG. 31, may further increase flight trueness. Furthermore, the front recess may promote expansion and/or fragmentation of the slug when it strikes a deformable target. When hit, the deformable target may flow into the recess, thus creating a force in the recess that may cause the slug to expand from the recess outward. The forward and/or rear recesses may be shaped with smooth curving surfaces that may help limit mechanical stress on the slug, which may cause the slug to undesirably fragment or otherwise break apart in larger component pieces. By this it is meant that the slug breaks into a discrete number of pieces, such as less than approximately twenty and often less than ten or five components, excluding particulate. As shown in FIG. 32, front recess 318 and rear recess 320 both are gradually curved, avoiding sharp corners and ledges that may act as stress points. It is within the scope of the disclosure that the slugs may be further configured to lessen stress, such as by smoothing the transition between the surface of a recess and the adjacent outer surface of the slug. It is also within the scope of the disclosure to shape the slug with sharp corners and/or ledges, if for example the ease of manufacturing such a slug outweighs the potential benefits of limiting sharp edges or if a particular application for the slug makes it desirable for the slug to fragment into larger component pieces upon impact.

In FIGS. 31 and 32, front recess 318 defines a region of concavity in the nose of the slug. Similar to the rear recess, the width and depth of the front recess, when present in a slug 310, may vary within the scope of the disclosure from the illustrative example shown in FIGS. 31 and 32. When present, the front recess will typically have a diameter or width (depending upon the particular geometry of the recess) that is at least 5% of the diameter of the slug, and often which is at least 10–20% or more of the diameter D (as indicated in FIG. 31) of the slug. Similarly, the depth of the front recess will typically be at least 5% of the length L of the slug, and often will be in the range of 2%–25%, 5%–15%, or 5%–40% or more of the length of the slug. In some embodiments, a front recess and a rear recess may extend into one another, thereby providing a somewhat toroidal slug having an inner channel.

As indicated in FIGS. 31, 35 and 36, the slugs each have a diameter, which may be sized to correspond to a particular diameter of firearm barrel. The individual diameters of slugs 311, 330 and 350 have been respectively indicated at D, D' and D" in FIGS. 31, 35 and 36. Slugs with greater diameters are compatible with firearm barrels having relatively large bores, while slugs with lesser diameters are compatible with firearm barrels having relatively small bores. Therefore, a particular slug diameter may be sized to correspond to firearms of a particular gauge or caliber. It is within the scope of the disclosure to construct slugs for virtually any size and/or type of firearm. As described herein, the actual diameter of the slug may be smaller than the bore of the firearm, to accommodate a slug cup or sabot. Similarly, the particular length L of a slug along the longitudinal axis A may be sized to accommodate a particular type of firearm and/or shooting application. To illustrate that slugs 310 according to the present disclosure may have a variety of lengths, slugs 330 and 350 are illustrated in FIGS. 35 and 36 with lengths L' and L". Slugs having relatively shorter lengths have proven to exhibit favorable accuracy attributes. Therefore, slugs according to some embodiments of the present disclosure may be designed to have a length L that is no greater than (less than or equal to) the corresponding diameter D of the slug. It is within the scope of the disclosures that a slug 310 may alternatively have a length L that exceeds the diameter D of the slug.

As discussed, the firearm slug 310 shown at 311 in FIGS. 31–34 is but an illustrative example of firearm slugs 266 that may be constructed according to the present disclosure. For example, and as also discussed above, the relative dimensions of the slug, including its length and width, as well as the number of recesses (if any) and dimensions of the recess(es) may vary without departing from the scope of the disclosure.

Another illustrative example of a firearm slug 310 constructed according to the present disclosure is shown in FIG. 35 and specifically indicated at 330. Like the previously illustrated slugs, slug 330 is produced from a composition of matter 16 . As shown in FIG. 35, slug 330 is dimensioned differently than the previously illustrated slug 311. For example, slug 330 is an example of a slug that does not include a front recess 318. Perhaps more particularly, slug 330 also demonstrates an example of a slug that includes a nose, or forward region, 316 having a blunt, or flat, tip 332. Slug 330 also demonstrates that it is within the scope of the disclosure for slugs to include a shoulder 334 generally between the nose and base of the slug. By "generally between," it is meant that the shoulder is located anywhere between the tip of the nose portion and the distal portion of the base portion. In other words, the shoulder portion does not need to be exactly equally spaced between the nose portion and the base portion.

FIG. 36 shows still another example of a slug produced from a composition of matter 16, yet which has a shape different than the previously illustrated slugs. Slug 350 also provides an additional example of a slug 310 that includes a flat nose portion, such as indicated at 352, and a shoulder 354. Slug 350 also graphically illustrates that slugs 310 according to the present disclosure may include rear recesses 320 having configurations other than the tapered configuration shown in FIGS. 31–35. It should be understood that slugs 311, 330, and 350 are provided as illustrative, non-limiting examples, and slugs with different shapes are within the scope of the disclosure.

Slugs 266, such as the above-described Foster-type slugs 310 may be produced using any of the powder-metallurgy or other processes described herein. When produced via powder metallurgy from composition of matter 16, the composition of matter may initially be compacted to an intermediate structure 36, and thereafter reshaped, heated, sealed, coated, plated, worked and/or jacketed, such as described herein. It is also within the scope of the present disclosure that the slugs may be compacted directly to a (near) net final shape or cast from a molten feedstock containing composition of matter 16. Regardless, the sealing, coating, plating, reshaping, heating and other optional processing steps may still be selectively utilized within the scope of the present disclosure.

Figure 37:
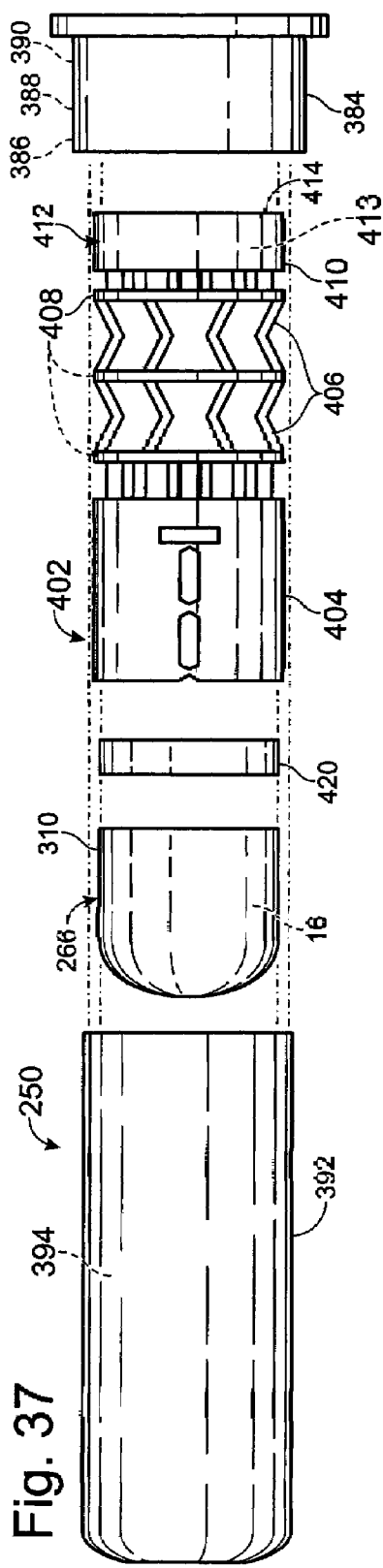
FIG. 37 is an exploded elevation view of a portion of a slug cartridge that includes a slug cup and a firearm slug.
Figure 38:
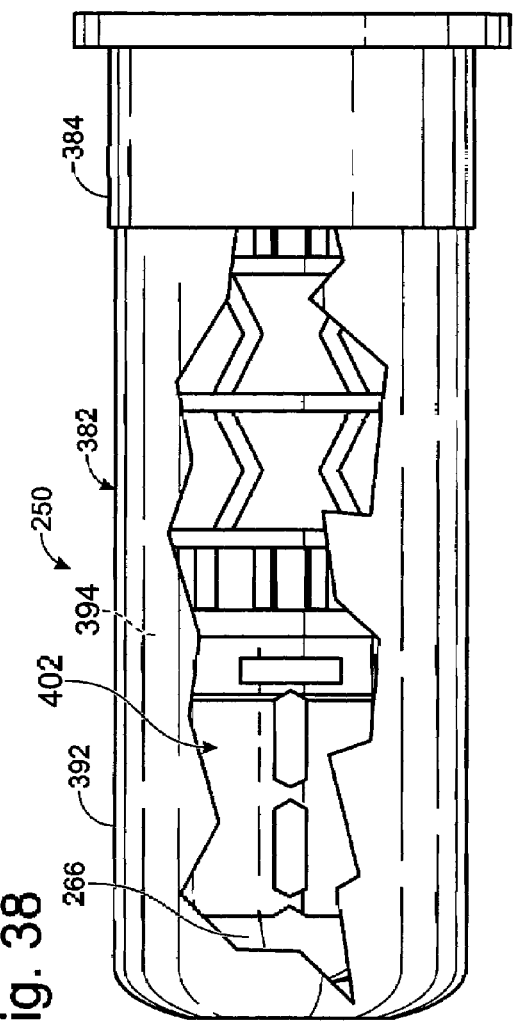
FIG. 38 is a fragmentary assembled view of the slug cartridge of FIG. 37.

As shown in FIGS. 37 and 38, slugs 266, such as any of the above-discussed Foster-type slugs 310, may be a constituent element of a slug shell, or slug cartridge 250. As shown in FIG. 37, shell 250 includes a case, or casing, 382. Casing 382 includes a base 384, which is typically formed from metal and houses the cartridge's wad 386, charge 388 and primer, or priming mixture, 390. The casing also includes a hull, or slug-region, 392 that is typically formed from plastic or another suitable non-metallic component and which defines a chamber 394 into which a slug 266, such as slug 310, is housed. The top of the hull is typically crimped closed, although other constructions and sealing methods may be used, including a construction in which the top of the hull forms a band with an opening having a smaller diameter than the slug and which is positioned over at least a portion of the nose of the slug. As discussed, a conventional slug cartridge is designed to house a single slug, which according to the present disclosure will be any of the slugs described, illustrated and/or incorporated herein. It is within the scope of the disclosure that shell 250 may include other constituent elements, as are conventional or otherwise known in the field of slug cartridge construction.

Shotgun cartridges that contain a shot slug may, but are not required to, include a slug cup within chamber 394. An example of a suitable slug cup is shown in FIGS. 37 and 38 and indicated generally at 402. Slug cup 402 is configured to receive and house a slug 266, such as slug 310, in a slug-engaging portion 404. Slug-engaging portion 404 may be shaped to closely correspond to the shape of slug 310, or at least a base portion thereof. In particular, in some embodiments, the slug-engaging portion may include ridges (not shown) complementarily configured relative to corresponding grooves on the surface of the slug. Such ridges may be located on the outer surface of the slug, the inner surface of a rear internal recess, and/or at the tail end of the slug. Other mechanical and/or non-mechanical engagement mechanisms are within the scope of the disclosure. For example, these mechanisms include mechanisms in which the slug is seated within the slug cup but not mechanically locked or fixed relative to the slug cup, as well as mechanisms that are configured to create an enhanced friction between the slug and the cup, thus causing the slug to spin when the cup spins. To this end, the cup may be constructed to engage the rifling of a barrel. For example, the cup may be constructed from a material suitable for being fired down a barrel while engaging the rifling of the barrel. It has been found that nylon is well suited for engaging rifled barrels, although other materials may be used, such as polyethylene. The thickness of the cup may be dimensioned to increase the ability of the rifled barrel to impart spin on the cup and the slug. Furthermore, the cup may be configured for use in non-rifled barrels, and in some embodiments the same slug cartridge may be used in both rifled barrels and non-rifled barrels. The slug cup limits direct physical contact between the slug and the rifling, thus limiting potential harm the slug may cause to the rifling, especially in embodiments that do not utilize plating, which also may be used for engaging and/or protecting rifled barrels.

In FIG. 37, cup 402 is also shown with optional cushioning, or shock-absorbing, portion 406 and at least one gas seal 408. The cushioning portion may be utilized to lessen the initial forces delivered to the slug when the slug is fired. However, it is within the scope of various embodiments of the present disclosure to construct a slug cartridge without such a cushioning portion. A gas seal 408 may be attached to a firing cup 410. The firing cup and the gas seal may collectively define a charge volume 412, which may be used to hold a charge, such as a quantity of gunpowder. The firing cup may include a primer, such as schematically shown at 414, which facilitates controlled ignition of the charge when firing the slug. As discussed, at least portions of the charge, wadding and/or primer may be housed within the base of the shell but not within volume 412.

As discussed, slug shell 250 also includes a casing 382 that includes a hull 392. Hull 392 may be approximately one to four inches long, and is configured to securely attach to the firing cup, which typically includes the primer. The hull extends from the firing cup around the slug cup and the slug. The hull may be roll crimped around the slug, or otherwise fastened about the slug. The hull is typically constructed from a plastic material, such as polyethylene, although other materials are within the scope of the disclosure.

The slug cartridge may further include a force distributor 420. In particular, force distributor 420 may be particularly suitable in embodiments in which the slug is frangible and/or includes a rear internal recess. The force distributor may be configured to withstand the force of firing, more evenly distribute the force of firing to the slug and/or limit clogging of the rear internal recess, such as with portions of the slug cup. The force distributor is typically constructed from a relatively rigid material, such as nylon or another strong polymer, thus limiting deformation of the force distributor when the slug is fired.

Slugs 266 according to the present disclosure may also be utilized in slug cartridges that include a sabot. Similar to the slug cup, a sabot at least partially encloses the slug while the slug is in the slug cartridge and after firing of the cartridge while the slug is still within the barrel of the firearm. However, once the slug has cleared the barrel, sabots may be designed to remain with or to separate from the slug. A sabot may be used to enhance rotation of the slug by providing a physical linkage between the rifling of a barrel and the slug. When a slug cup or a sabot is used, the diameter of the slug may be decreased to limit physical contact of the slug with the rifling of the barrel, where such contact may damage the rifling. However, the slug cup or the sabot may compensate for the smaller diameter, and may simultaneously engage the rifling and the slug. Therefore, the rifling may cause the slug cup or the sabot to spin, which in turn may cause the slug to spin. Because the slug cup or the sabot is typically constructed from plastic or other materials that are substantially softer than the compacted composition of matter 16, damage to the rifling of a barrel is at least limited, and usually eliminated altogether. As described above, a slug cartridge constructed according to embodiments of the present disclosure may be used in either a rifled barrel or a non-rifled barrel.

In FIG. 39, an example of another firearm slug 266 that is constructed from composition of matter 16, such as via any of the powder metallurgy or melt-and-cast processes discussed herein, is shown. Slug 266 may be referred to as a saboted slug 430, in that it is designed to be housed within a sabot 432 when fired from a rifled or non-rifled (smooth bore) shotgun or other firearm. As shown, slug 430 includes a neck, or shaft, 434 that is sized to be received and engaged within a chamber 436 of sabot 432. In the illustrated embodiment, the sabot is adapted to frictionally engage shaft 434 of the slug such that the sabot travels with the slug not only when traveling down the barrel of a firearm, but also during flight to a target. The outer surface 438 of the shaft and/or inner surface 440 of the sabot's chamber 436 may be adapted to promote rotation of the slug and the sabot as a unit, or more specifically to prevent slipping between the slug and the sabot. Slipping refers to the slug and the sabot not rotating as a unit, such as when the sabot rotates around the slug or the slug rotates within the sabot. As an example of a slip-preventing configuration, shaping the transverse dimension (perpendicular to the long axis) of the shaft and chamber to have a non-circular shape and/or to include ridges, projections, recesses, corners or other discontinuities forces the slug and sabot to rotate as a unit. For example, the shaft and chamber may be hexagon (or other polygonal) configurations. Alternatively, the slug and sabot may be configured to merely have a frictional engagement with each other or to have a sufficiently loose engagement for the sabot to separate from the slug after leaving the barrel of a firearm. In the illustrated embodiment, sabot 432 further includes shock absorbers 406, at least one gas seal 408 and a firing cup 410, that are similar to the above-discussed structure of FIG. 37. It is within the scope of the disclosure, however, that slug 430 may be utilized with sabots having different shapes and/or structure without departing from the scope of the present disclosure.

Slug 430 includes a head 442 that projects from the sabot. In the illustrated example, the head has an outer perimeter 444 that is greater than the inner perimeter (defined by inner surface 440) of the sabot's chamber, but smaller than the outer perimeter 446 of the sabot. This configuration enables the slug to be positioned within the sabot so that the head projects from the sabot, while also preventing the head of the slug from engaging the barrel of the shotgun or other firearm from which the slug and sabot are fired. Instead, the barrel is engaged by the larger-diameter sabot, which as discussed, is typically formed from plastic or another softer material that is not likely to damage the barrel (including any rifling of the barrel, when present).

As discussed, the terms slugs and bullets are generally used to refer to single projectiles that are fired from a firearms cartridge, with slugs generally referring to single projectiles that are fired from shot shells (i.e. from shotguns) and bullets generally referring to projectiles that are fired from handguns and rifles. As discussed in more detail herein, bullets are typically fired from bullet cartridges and typically are expelled from the corresponding barrels at higher velocities than slugs. Bullet cartridges are metallic, with the bullets themselves often being at least partially, or even completely, enclosed in a metallic jacket.

Before discussing in more detail conventional bullets and bullet cartridges that include bullets according to the present disclosure, it is within the scope of the present disclosure to form various non-jacketed bullets and/or bullets that are not designed to be assembled into a sealed cartridge prior to use from composition of matter 16, such as via any of the methods disclosed herein. An example of such a bullet is shown in FIG. 40 and generally indicated at 450. Bullet 450 may be referred to as a black-powder bullet or a musket bullet, in that it is designed to be fired from a rifle or other firearm in which the powder (or other propellant or charge) is manually loaded separate from the bullet. Typically, the bullet is forced down the barrel of the rifle (such as with a ramrod) in the opposite direction from which the bullet is fired out of the rifle.

In the illustrative example shown in FIG. 40, bullet 450 includes a neck, or shaft, 452 and a projecting head 454 that has a larger diameter than the shaft. Also shown in FIG. 40 is a sabot 456 that includes a chamber 458 that is sized to receive and engage shaft 452 of the bullet. Preferably, the bullet and shaft are sized to have a sufficient friction fit for the bullet and sabot to rotate at least substantially as a unit (meaning that only minimal slippage occurs). Even more preferably, the bullet and sabot sufficiently engage each other to prevent slippage and/or are dimensioned and/or shaped to include slip-preventing structure. Similar to the previously discussed sabots, sabot 456 is preferably formed from plastic or another sufficiently soft material that will not damage the rifling of the barrel of the firearm from which the bullet and sabot are fired. Accordingly, the sabot will typically have a larger outer diameter than the bullet.

As discussed, bullet 450, as well as the slugs and other firearms projectiles described and/or illustrated herein are formed from composition of matter 16, such as by any of the methods disclosed herein, including any of the compressing, activating, shaping, sealing, heating, reforming/reshaping, working, coating, plating, and/or jacketing steps described herein. Similarly, although not required for all slugs, bullets or other projectiles according to the present disclosure, it is within the scope of the present disclosure to produce a projectile having greater downrange energy than a similarly sized lead or lead-antimony projectile. This energy may result in a greater impact force and/or depth of penetration compared to the lead or lead-antimony projectile. For example, in experiments, slug 450 and a lead-antimony slug of the same dimensions were fired into a block of maple. Slug 450 penetrated into the block more than twice as deep as the lead-antimony slug (more than six inches, compared to less than three inches). When utilized, this increased penetrating strength may be helpful in hunting larger game, especially in regions where high-power rifles are not permitted.

Figure 41:
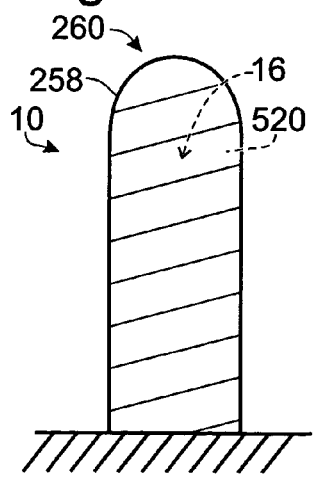
FIG. 41 is a cross-sectional view of a bullet according to the present disclosure.
Figure 42:
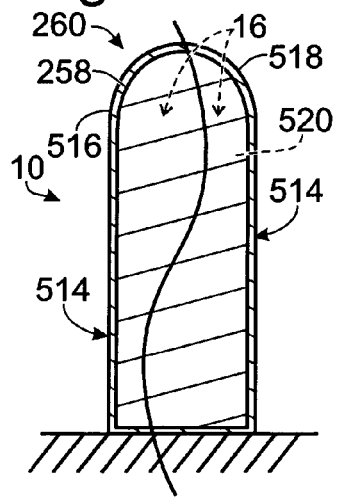
FIG. 42 is a cross-sectional view of another bullet according to the present disclosure.
Figure 43:
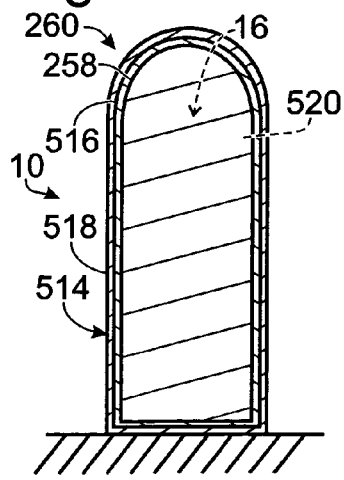
FIG. 43 is a cross-sectional view of another bullet according to the present disclosure.

FIGS. 41–43 graphically, and somewhat schematically, depict examples of illustrative firearm bullets 260 constructed in accordance with the present disclosure. Each of the bullets includes a core 258 that is constructed from composition of matter 16, such as via powder metallurgy from powder of composition of matter 16 or from a molten feedstock of composition of matter 16. In the following discussion, the term "core" or bullet "core" will be used to refer to the compacted structure that is produced from composition of matter 16. As introduced with respect to FIG. 41, however, in some embodiments, these cores may also be referred to as a bullet, such as when the cores are incorporated into a firearms cartridge without plating or jacketing the core.

As discussed, cores 258 and/or bullets 260 may be constructed to have densities that are less than, equal to, or greater than a similarly-sized core or bullet formed from lead or a lead-antimony alloy. Similarly, cores 258 and/or bullets 260 may be constructed to have a greater density than a similarly constructed lead or lead-antimony core or bullet and thereby produce a shorter or otherwise differently shaped core or projectile that has the same mass as a comparative lead or lead-antimony core or bullet. As another design consideration, the drag exerted on a bullet as it is propelled from a firearm is inversely proportional to the density of the bullet times the diameter of the bullet. Therefore, when comparing equal diameter bullets formed from lead or lead-antimony and a bullet that is formed from a composition of matter 16 and which has a greater bulk density than the lead or lead-antimony bullet, the lead-substitute bullet should experience less drag.

It is also within the scope of the disclosure to produce bullet cores and/or bullets that are formed from composition of matter 16 and which have a bulk density that corresponds to, or equals, the bulk density of a particular conventional lead or lead-antimony bullet. For example, it is within the scope of the disclosure to produce a bullet core with a density that equals the density of a bullet core formed from lead or a lead-antimony alloy that is conventionally used in firearms projectiles, such as a density of 11.3 g/cc (lead), 11.2 g/cc (lead with 1–2 wt % antimony), 1.1 g/cc (lead with 3–4 wt % antimony), or 10.9 g/cc (lead with 6 wt % antimony). Relatedly, it is also within the scope of the disclosure to produce a jacketed or plated bullet with a core that is formed from composition of matter 16 and which has a bulk density that corresponds to the bulk density of a conventional jacketed bullet containing a lead or lead-antimony core.

Such a "lead-equivalent" bullet is useful in practice ranges or other situations where lead or lead-antimony bullets are prohibited or otherwise not desirable. For example, many practice ranges have prohibited the use of lead or other toxic bullets. Therefore, individuals cannot directly use these ranges to improve their marksmanship with conventional lead or lead-antimony bullets. A non-toxic bullet according to the present disclosure may be used at such a range. However, if the bullet has a bulk density that is greater or less than the bulk density of the conventional lead or lead-antimony bullet, then the individual will be practicing with a bullet that exhibits different flight characteristics than the lead or lead-antimony bullets that may be used outside of the practice range. Therefore, even if the lead-substitute bullets are able to be prepared with more desirable properties and/or flight characteristics than conventional lead or lead-antimony bullets, in some applications it is desirable to construct these bullets to exhibit the flight characteristics of conventional lead or lead-antimony bullets. For example, the dimensions, processing techniques, materials of construction, optional coating/plating layers, layer/jacket thicknesses, etc. may be used to calibrate the mass of a bullet that includes a core formed from composition of matter 16 to correspond to that of another bullet, such as a lead or lead alloy bullet. An example of a method for calculating the bulk density of a bullet, including a jacketed or other multi-component bullet is presented in the above-incorporated U.S. Provisional Patent Application Ser. No. 60/422,935, the disclosure of which is incorporated by reference herein for all purposes.

The examples of bullets 260 shown in FIGS. 41–43 have been somewhat schematically illustrated. It is within the scope of the disclosure to shape the bullets to have any suitable bullet geometry, such as the shapes of conventional lead or lead-antimony bullets. The illustrated bullets 260 are provided as non-limiting examples, and it should be understood that other sizes and shapes may be used. Similarly, the thicknesses of the plating and/or jacket may vary, as described in more detail herein.

As discussed in more detail herein, the cores may be prepared by methods that include any of the compacting, heating, sealing, reshaping, activating, working, coating, plating and/or jacketing steps described herein. In FIG. 41, the core forms the entire bullet, while in FIG. 42 the bullet includes an outer layer 514 that is formed from a different material than the core. As discussed, this outer layer may take the form of a coating or plating layer 516 or a jacket 518. In FIG. 43, the bullet includes both a coating/plating layer 516 and a jacket 518. Although it is within the scope of the present disclosure to produce cores, bullets and other articles by a method that does not include a sealing step, such a step will often be desirable, at least for many powder metallurgy methods of formation. This optional sealing layer, which extends beneath the outer surface of the compacted core, is indicated schematically at 520 in FIGS. 41–43.

As discussed, jacket 518 is typically formed from metal and is swaged or otherwise applied in solid form around the core. Jacket 518 will typically have a greater thickness than plating layer 516. For example, a jacket 518 will typically have a thickness of at least approximately 0.01 inches. In practice, a 0.015 inch jacket has proven effective, but is by no means meant to be an exclusive example of suitable jacket thicknesses. Copper is an example of a suitable material for jacket 518 when bullet 260 is designed to travel at velocities of approximately 2000 feet per second or less, such as is common for most pistols and lower velocity rifles. However, bullets 260 for higher velocity rifles will often travel at 2500 feet per second or more and will typically utilize a more durable jacket. An example of a suitable high-velocity jacket material is gilding metal, which is an alloy of copper and approximately 5 wt % zinc. Jackets of other materials and/or thicknesses may also be used without departing from the scope of the disclosure.

Jacket 518 may completely enclose core 258 and closely conform to the shape and size of the core, such as shown in FIGS. 42 and 43. However, it is also within the scope of the present disclosure that the jacket may define a region that is not filled with the core and/or its sealant/coating/plating. It is also within the scope of the present disclosure that the jacket may only extend around a portion of the core, thereby leaving a portion of the core accessible from external the jacket. This accessible portion may be recessed beneath an open end of the jacket, flush with the open end of the jacket, or project from the open end of the jacket. As another variation, the jacket may be twisted about the core, which may enhance the spinning effect of the bullet when fired.

In FIG. 44, an article 10 in the form of a firearms cartridge 252 housing a bullet 260 is shown. Bullet 260 schematically is intended to represent any bullet described, illustrated and/or incorporated herein that includes composition of matter 16 and which optionally may be produced via any of the methods disclosed, illustrated and/or incorporated herein. Cartridge 252 includes a case or casing 592. Casing 592 includes a cup 594, a charge 596 and a primer, or priming mixture, 598. Casing, primer and charge may be of any suitable materials. Cartridge 252 is ready to be loaded into a gun, such as a handgun, rifle or the like, and upon firing, discharges bullet 260 at high speeds and with a high rate of rotation. Although illustrated in FIG. 44 as a centerfire cartridge, in which primer 598 is located in the center of the base of casing 592, bullets according to the present disclosure may also be incorporated into other types of cartridges, such as a rimfire cartridge, in which the casing is rimmed or flanged and the primer is located inside the rim of the casing.

Another example of a bullet 260 that includes a core 258 according to the present disclosure is shown in FIG. 45 and generally indicated at 620. As shown, bullet 620 includes a jacket 622 having a rearward region 624 containing a core 258 that is formed from composition of matter 16. As shown, the jacket further includes a forward region 626 that does not include core 258 or composition of matter 16. Instead, this forward region is preferably either hollow or at least partially filled with a comparatively soft, ductile material 628, such as plastic, tin or zinc. Material 628 may partially or completely fill region 626 and may be present in a variety of forms, such as in powder form, as a single solid mass, as a plurality of discrete pellets, etc. In the illustrated embodiment, jacket 622 completely encloses the rearward and forward regions. However, and as indicated in dashed lines in FIG. 45, it is within the scope of the disclosure that the jacket may only partially enclose these regions, such as to leave a portion of the forward region open. For example, this region may define a hollow nose or tip of the bullet, or material 628 may project beyond the opening in the jacket.

Bullet 620 is designed for hunting larger animals or similar targets in which it is desirable for the bullet to strike the target with significant force and thereafter mushroom as the bullet penetrates the target. As such, bullet 620 will typically be designed to travel at high velocities, and therefore should have a jacket constructed to withstand such velocities. In the case of bullet 620, core 258 preferably has a density of at least 11 g/cc and more preferably has a density of at least 12 g/cc, such as a density in the range of 12 g/cc and 15 g/cc. In the illustrated embodiment, core 258 has a generally right cylindrical configuration, which as discussed promotes a higher bulk density than other core shapes. However, it is within the scope of the disclosure that the core may have other configurations. Similarly, core 258 may have any of the variations described and/or illustrated herein, such as being sintered or not sintered, frangible or infrangible, and/or (as indicated in fragmentary lines) coated/plated or not coated/plated and/or sealed or not sealed.

A variation of bullet 620 is shown in FIG. 46 and indicated generally at 620'. As shown, jacket 622 includes a partition 630 that separates the forward and rearward regions. Expressed in other terms, the partition extends between core 258 and material 628. Bullet 620' and its component parts may have any of the elements, subelements and/or variations described with respect to bullet 620 or elsewhere herein. Similarly, bullets 620 and 620' may be incorporated into firearms cartridges, such as previously described with respect to FIG. 44.

Frangible and/or Ferromagnetic

Firearms projectiles 254 constructed according to the present disclosure may be either ferromagnetic or non-ferromagnetic, as discussed previously. Similarly, projectiles 254 may be frangible or infrangible. For example, in some applications it may be desirable for the projectile to be infrangible to increase the penetrating strength of the projectile. Alternatively, it may be desirable in other applications for the projectile to be frangible to decrease the penetrating strength and potential for ricochet of the projectile. For example, frangible projectiles may be desired when the projectiles will be used for target practice.

By "frangible," it is meant that the projectile is designed to remain intact during flight but to break into pieces upon impact with a relatively hard object. Frangible projectiles may also be referred to as non-ricocheting projectiles. Although it is within the scope of the present disclosure that projectile 254 is constructed, or designed, to break into several pieces upon impact, it is preferred that projectile 254 is at least substantially reduced to powder upon impact, and even more preferable that the projectile is completely reduced to powder upon impact. By "substantially reduced to powder" it is meant that at least 50% of the portion of the projectile formed from composition of matter 16 is reduced to powder. Preferably, at least 75%, and even more preferably, at least 95% of the portion of the projectile that is formed from composition of matter 16 is reduced to powder upon impact. Another exemplary construction for a frangible projectile is a projectile in which the resulting particles from the composition of matter forming the bullet (or core) each weigh less than 5 grains (0.324 grams). When the projectile or other article is frangible, it may be coated, painted, or plated to reduce particle loss during handling and machining. For example, a wax, epoxy or metal coating may be used.

Figure 47:
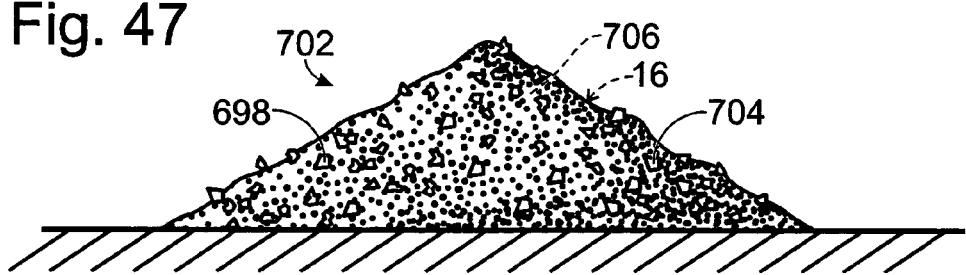
FIG. 47 is a schematic side elevation view showing a frangible embodiment of a bullet of the present disclosure after the bullet has been fired.
Figure 48:
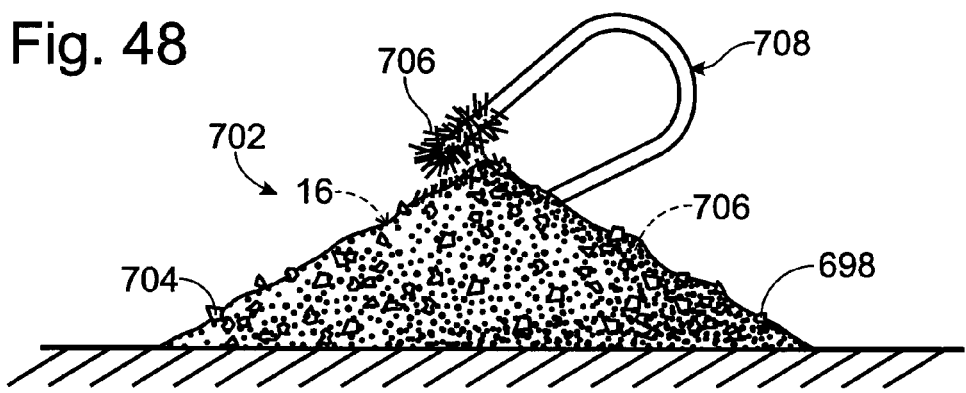
FIG. 48 is a schematic side elevation view showing a method for recovering ferromagnetic portions of the bullet of FIG. 47.

In FIG. 47, resultant powder 702 produced from a fired frangible jacketed bullet is shown. In FIG. 48, portions of a jacket 698 are visible in the resultant powder. In many applications, powder 702 may contain contaminants 704, such as portions of targets, debris and the like that are mixed with the powdered bullet when the powder is accumulated. In embodiments in which at least portions of the composition of matter 16 is ferromagnetic, such as by including ferrotungsten, at least the ferromagnetic portion 706 of the composition of matter may be recovered from the resultant powder using a magnet 708, as somewhat schematically illustrated in FIG. 48. Similarly, magnets may be used to recover magnetic projectiles from bodies of water and from shooting ranges. Such a projectile may also be referred to as a recyclable projectile because it is easily reclaimed. Using a ferromagnetic composition of matter 16 also enables an easy determination, using a magnet, that the projectile is not formed from lead, which is not magnetic.

Although ferromagnetic powders may be desirable in some applications, it is within the scope of the present disclosure that tungsten-containing powders may be used that are not ferromagnetic or which do not produce a ferromagnetic composition of matter 16 in the concentration in which the powder is present.

INDUSTRIAL APPLICABILITY

The present disclosure is applicable to the firearms and other fields in which tungsten-containing articles are used and/or in which tungsten-containing articles may be used as lead substitutes.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the disclosure or subsequently filed claims recite "a" or "a first" element or the equivalent thereof, it should be within the scope of the present inventions that such disclosure or claims may be understood to include incorporation of one or more such elements, neither requiring nor excluding two or more such elements. Similarly, the lengthy preceding description includes headings to assist in the reading and/or subdivision of the lengthy disclosure. These headings should not be read in a limiting sense or otherwise construed to require certain steps or techniques for all articles or methods according to the present disclosure.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A method for producing a firearms cartridge containing at least one tungsten-containing projectile, the method comprising:
   compacting a tungsten-containing mixture of powders to form a compacted structure having an outer surface, wherein the mixture of powders includes at least one tungsten-containing component and at least one binder component, wherein the at least one binder component includes a metallic binder component, and further wherein the compacted structure has a density of at least 9 g/cc;
   applying a sealant to the compacted structure;
   infiltrating the sealant beneath the outer surface of the compacted structure;
   curing the sealant; and
   assembling a firearms cartridge containing the compacted structure as a firearms projectile.

2. The method of claim 1, wherein after the infiltrating step, the outer surface of the compacted structure includes sealant, and further wherein the sealant on the outer surface is not removed prior to the assembling step.

3. The method of claim 1, wherein the method further includes reshaping the compacted structure after the curing step.

4. The method of claim 3, wherein the method further includes resealing the compacted structure after the reshaping step.

5. The method of claim 3, wherein the reshaping step includes grinding the compacted structure to remove material therefrom.

6. The method of claim 5, wherein the compacted structure includes a projecting shoulder and further wherein the grinding step includes removing material from the projecting shoulder.

7. The method of claim 5, wherein the grinding step includes removing material from the compacted structure to form an arcuate portion from a projecting edge portion of the compacted structure.

8. The method of claim 3, wherein the reshaping step comprises reshaping the compacted structure to produce an at least near net final shape article having an outer surface.

9. The method of claim 3, wherein the reshaping step includes compressing the compacted structure with at least one punch having a face that does not correspond to the shape of the compacted structure.

10. The method of claim 3, wherein the reshaping step includes plastically deforming the compacted structure to a shape that is different from its shape prior to the reshaping step.

11. The method of claim 1, wherein the method further includes strengthening the compacted structure.

12. The method of claim 11, wherein the strengthening step includes heating the compacted structure.

13. The method of claim 12, wherein the strengthening step includes heating the compacted structure to a temperature that is less than the melting point of a lowest melting one of the at least one tungsten-containing component and the at least one binder component.

14. The method of claim 1, wherein the at least one binder component further includes at least one non-metallic binder component.

15. The method of claim 14, wherein the method further comprises strengthening the compacted structure by activating at least a portion of the at least one non-metallic binder component.

16. The method of claim 15, wherein the binder component further includes a curable non-metallic binder component and the activating step includes curing the curable binder component.

17. The method of claim 1, wherein the method includes heating the compacted structure.

18. The method of claim 1, wherein the method includes plating the compacted structure.

19. The method of claim 1, wherein the metallic binder component includes tin.

20. The method of claim 1, wherein the tungsten-containing component includes at least one of ferrotungsten and an alloy of tungsten, nickel and iron.

21. The method of claim 1, wherein the tungsten-containing component forms a majority component of the mixture, and further wherein tungsten forms a majority component of the tungsten-containing component on an element-by-element basis.

22. The method of claim 1, wherein the infiltrating step includes infiltrating the sealant via vacuum impregnation.

23. The method of claim 1, wherein after the infiltrating step, the outer surface of the compacted structure includes sealant, and further wherein the sealant on the outer surface is removed prior to the assembling step.

* * * * *